(12) United States Patent
Hosokawa et al.

(10) Patent No.: US 9,853,774 B2
(45) Date of Patent: Dec. 26, 2017

(54) SYSTEM AND METHOD FOR RESTORING A STATUS OF AN APPARATUS CONTROLLED BY MULTIPLE COMMANDS

(71) Applicant: FUJITSU LIMITED, Kawasaki-shi, Kanagawa (JP)

(72) Inventors: Youichi Hosokawa, Hakusan (JP); Kenya Takuwa, Kanazawa (JP); Naomi Sakurai, Kanazawa (JP); Yoshinari Akakura, Oyabe (JP); Tomoyuki Harada, Kanazawa (JP); Eijiro Yoshida, Nomi (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 15/164,336

(22) Filed: May 25, 2016

(65) Prior Publication Data

US 2016/0359586 A1  Dec. 8, 2016

(30) Foreign Application Priority Data

Jun. 3, 2015 (JP) ................................ 2015-113110

(51) Int. Cl.
*H04L 1/14* (2006.01)
*H04L 29/08* (2006.01)
(Continued)

(52) U.S. Cl.
CPC ................ *H04L 1/14* (2013.01); *H04L 12/28* (2013.01); *H04L 12/6418* (2013.01); *H04L 69/08* (2013.01); *H04L 69/323* (2013.01)

(58) Field of Classification Search
None
See application file for complete search history.

(56) References Cited

U.S. PATENT DOCUMENTS 8,612,629 B1 * 12/2013 Lo ....................... H04L 49/3054
370/257
2002/0161615 A1  10/2002 Yui et al.
(Continued)

FOREIGN PATENT DOCUMENTS

JP       6-252986      9/1994
JP       2002-324155   11/2002

*Primary Examiner* — Brian Roberts
(74) *Attorney, Agent, or Firm* — Staas & Halsey LLP

(57) ABSTRACT

A system includes first, second, and third apparatuses. The second apparatus converts a first control-command received from the first apparatus to second control-commands compatible with the third apparatus, requests the third apparatus to perform the second control-commands, and notifies the first apparatus of a normal finish of the first control-command when all the second control-commands have finished normally, so that the first apparatus updates a first status of the third apparatus that is held by the first apparatus. The third processor updates a second status of the third apparatus that is held by the third apparatus, upon finishing each second control-command, generates reverse-commands for restoring a result of having executing the second control-commands to a status prior to executing the second control-commands, and, when all the second control-commands have not been executed, restores the second status to a status prior to having executed the second control-commands by executing the reverse-commands.

5 Claims, 17 Drawing Sheets

(51) Int. Cl.
*H04L 12/28* (2006.01)
*H04L 29/06* (2006.01)
*H04L 12/64* (2006.01)

(56) References Cited

U.S. PATENT DOCUMENTS

| | | | |
|---|---|---|---|
| 2003/0084219 A1* | 5/2003 | Yao | H04L 29/06 710/300 |
| 2003/0093541 A1* | 5/2003 | Lolayekar | H04L 67/1097 709/230 |
| 2008/0219238 A1* | 9/2008 | Das | H04L 12/40013 370/351 |
| 2008/0244150 A1* | 10/2008 | Sharma | H04L 12/4625 710/316 |
| 2009/0077298 A1* | 3/2009 | Whitby-Strevens | G06F 13/4027 710/315 |

* cited by examiner

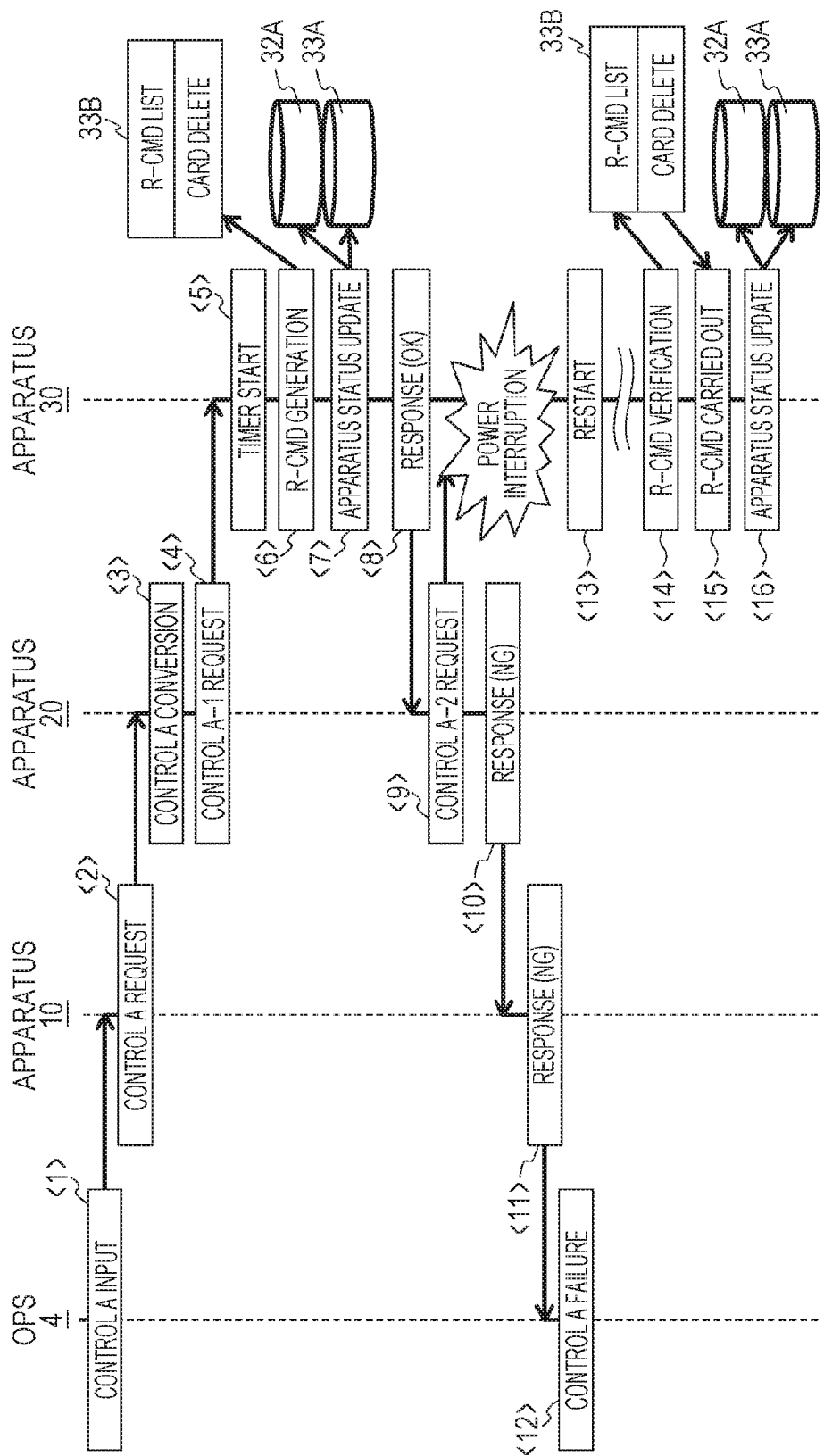

SYSTEM AND METHOD FOR RESTORING A STATUS OF AN APPARATUS CONTROLLED BY MULTIPLE COMMANDS

CROSS-REFERENCE TO RELATED APPLICATION

This application is based upon and claims the benefit of priority of the prior Japanese Patent Application No. 2015-113110, filed on Jun. 3, 2015, the entire contents of which are incorporated herein by reference.

FIELD

The embodiment discussed herein is related to system and method for restoring a status of an apparatus controlled by multiple commands.

BACKGROUND

In recent years, because of the construction of ultrahigh speed-high capacity transmission networks, the introduction of 100 Gigabit Ethernet (registered trademark) (100 GbE) is progressing. For each introduction of 100 GbE, there are cases where transmission apparatuses (as a transmission apparatus 1) that support 100 GbE and existing transmission apparatuses (as a transmission apparatus 2) are combined. For example, a transmission apparatus that supports 40 Gigabit Ethernet (registered trademark) (40 GbE) may be used as the known transmission apparatus 2.

In a case where there is a difference in interface between the transmission apparatus 1 and the transmission apparatus 2, a translation apparatus is arranged between the transmission apparatuses 1 and 2. The transmission apparatus 1 and the translation apparatus, and the translation apparatus and the transmission apparatus 2, are each connected by a communication circuit. The translation apparatus converts a control requested from the transmission apparatus 2 to a control compatible with the transmission apparatus 1, and inputs the result to the transmission apparatus 1. The transmission apparatus 1 executes the control. The status of the transmission apparatus 1 is updated according to the execution of the control. The execution results of the control (success or failure) in the transmission apparatus 1 are returned to the translation apparatus. The translation apparatus receives the execution results from the transmission apparatus 1, and returns the results (success or failure) with respect to the requested control to the transmission apparatus 2. The transmission apparatus 2 updates the status of the transmission apparatus 1 managed with the transmission apparatus 2 in a case where the results indicate success.

Japanese Laid-open Patent Publication No. 06-252986 and Japanese Laid-open Patent Publication No. 2002-324155 are examples of the related art.

SUMMARY

According to an aspect of the invention, a system includes a first apparatus, a second apparatus connected to the first apparatus, and a third apparatuses connected to the second apparatus. The first apparatus stores first apparatus-status information indicating a status of the third apparatus that is updated by the first apparatus, provides the second apparatus with a first control command for controlling the third apparatus, and updates the first apparatus-status information stored in the first apparatus when information indicating a normal finish of the first control command is received from the second apparatus. The second apparatus converts the first control command received from the first apparatus to a plurality of second control commands compatible with the third apparatus, provides the third apparatus with a request to perform the plurality of second control commands, and transmits information indicating a normal finish of the first control command to the first apparatus when all the plurality of second control commands finish normally. The third apparatus stores second apparatus-status information indicating a status of the third apparatus that is updated by the third apparatus, and a reverse command for restoring a result of executing each second control command to a result prior to executing the each second control command, executes the plurality of second control commands, based on a request from the second apparatus, and updates the second apparatus-status information in connection with finish of each second control command. The third apparatus transmits a normal-finish notification indicating a normal finish of the plurality of second control commands to the second apparatus, generates a reverse command in connection with execution of each second control command, and store the generated reverse commands. In a case where all of the plurality of second control commands have not been executed, the third apparatus causes the second apparatus-status information to be restored to information indicating a status prior to execution of the plurality of second control commands by executing control based on the reverse commands stored in the third apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a diagram illustrating an example of an operational sequence, according to an embodiment.

DESCRIPTION OF EMBODIMENT

Figure 1:
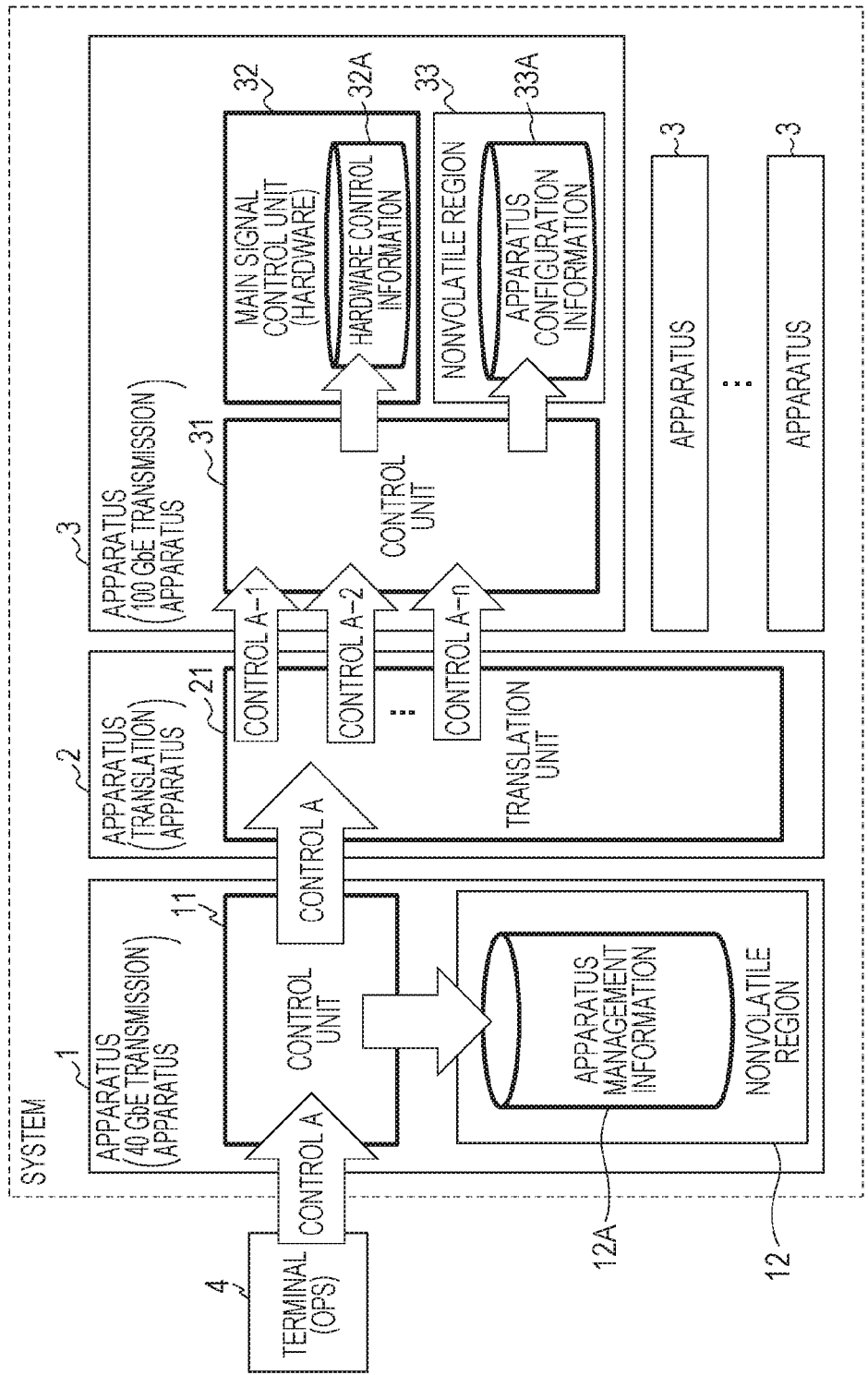
FIG. 1 is a diagram illustrating a configuration example of a system, according to a reference example.

The control requested from the transmission apparatus 2 may be converted to a plurality of controls (for example, as a control 1 and control 2) for the first transmission apparatus 1. In this case, cases may arise in which the connection between the transmission apparatus 1 and the translation apparatus is disconnected after execution of the control 1 in the transmission apparatus 1, and the control 2 is not executed. In this case, the control formed of the control 1 and control 2 reaches an abnormal finish, and the translation apparatus notifies the transmission apparatus 2 of the failure of the control requested from the transmission apparatus 2. The transmission apparatus 2 receives the failure notification and does not update the status of the transmission apparatus 1 held by the transmission apparatus 2.

However, in the transmission apparatus 1, the status of the transmission apparatus 1 is updated according to the execution finish of the control 1. Therefore, a mismatch occurs between the status that the transmission apparatus 2 has and the status that the transmission apparatus 1 has.

A maintainer of the transmission apparatus 1 is able to know that a control fails in light of a failure notification received by the transmission apparatus 2. However the maintainer is unable to know whether the control is converted to a plurality of controls by the translation apparatus or up to what stage of the plurality of controls succeeds. Therefore, the maintainer travels to the installation position of the transmission apparatus 1 and performs a recovery task while verifying the status of the transmission apparatus 1. Such a task is troublesome.

An object of one aspect of the embodiment is to provide a technology able to easily resolve mismatches in apparatus states arising between apparatuses.

Hereinafter, the embodiment will be described with reference to the drawings. The configurations of the embodiment are examples and there is no limitation to the configuration of the embodiment.

Reference Example

Initially, a reference example will be described. FIG. 1 illustrates a configuration example of a system according to the reference example. The system illustrated in FIG. 1 includes a frame transmission apparatus 1 (below, referred to as "apparatus 1") that supports 40 GbE, a translation apparatus 2 (below, referred to as "apparatus 2"), and a frame transmission apparatus 3 (below, referred to as "apparatus 3) that supports 100 GbE. In FIG. 1, although a plurality of apparatuses 3 is provided, a system that includes a single apparatus 3 may be used. The apparatuses 1 and 2, and the apparatus 2 and each apparatus 3, are each connected via a communication circuit, and mutual communication is possible therebetween.

The apparatus 1 is connected to an operation terminal (Operation System (OPS)) 4 for maintaining and controlling the system. The apparatus 1 includes a control unit 11 and a nonvolatile region 12. The nonvolatile region 12 stores apparatus management information 12A. The apparatus 2 includes a translation unit 21. The apparatus 3 includes a control unit 31, a main signal control unit 32, and a nonvolatile region 33. The main signal control unit 32 is formed by hardware and stores hardware control information 32A. The nonvolatile region 33 stores apparatus configuration information 33A.

The main signal control unit 32 performs control (for example, signal multiplexing, signal distribution or switching, signal isolation, signal reproduction, signal amplification, and the like) according to the transmission of the main signal (transmission target signal). It is possible for the main signal control unit 32 to register and delete a card and port (described later). The hardware control information 32A is a collection of information (parameters) representing settings carried out on hardware that operates as the main signal control unit 32, and the hardware implements a status according to each parameter. The apparatus configuration information 33A is a list (database) indicating each setting carried out on the hardware.

In a case where an operator (maintainer) of the OPS 4 controls the apparatus 3, the operator inputs information (control information) indicating the control content to the apparatus 1. The control information input at this time is input in a format receivable by the apparatus 1. The control unit 11 of the apparatus 1 generates an execution request (execution demand) based on the control information in a format receivable by the apparatus 1.

When the control information of a given control (referred to as control A) in the apparatus 1 is created, the control unit 11 of the apparatus 1 generates the execution request of the control A, and transmits the generated execution request to the apparatus 2 via the communication circuit. The apparatus 2 performs translation of the execution request of the control A, and converts the control A to a reception request for a plurality of (n (n is a positive integer)) controls A-1 to A-n with a format receivable by the apparatus 3. The apparatus 2 transmits each execution request for the control A-1 to A-n to the apparatus 3 via the communication circuit.

The control unit 31 of the apparatus 3 executes each of controls A1 to A-n according to the execution request, and updates the hardware control information 32A of the main signal control unit 32 and the apparatus configuration information 33A in the nonvolatile region 33, based on the execution results of each control. The execution result (normal finish (OK) or abnormal finish (NG)) of each of controls A-1 to A-n is returned to the apparatus 2. When all of the processes of the controls A1 to A-n are finished as OK, the apparatus 2 transmits a notification indicating the normal finish of the control A to the apparatus 1.

In the apparatus 1, when the control unit 11 receives the notification indicating the normal finish of the control A, the apparatus management information 12A in the nonvolatile region 12 is updated to content according to the normal finish of the control A. The apparatuses 1 and 3 hold apparatus statuses in mutually differing formats in light of differences in the apparatus configurations and the like. In the apparatus 3, the apparatus status (hardware control information 32A and apparatus configuration information 33A) is updated for each control (control A-1, A-2, . . . A-n). In the apparatus 1, the apparatus management information 12A is updated with the normal finish of the control A for which the controls A1 to A-n are the source (the apparatus status after execution of the control A is stored). Thereby, the integrity between the apparatus status of the apparatus 3 and the apparatus status of the apparatus 1 (the apparatus status of the apparatus 3 managed by the apparatus 1) is maintained.

Figure 2:
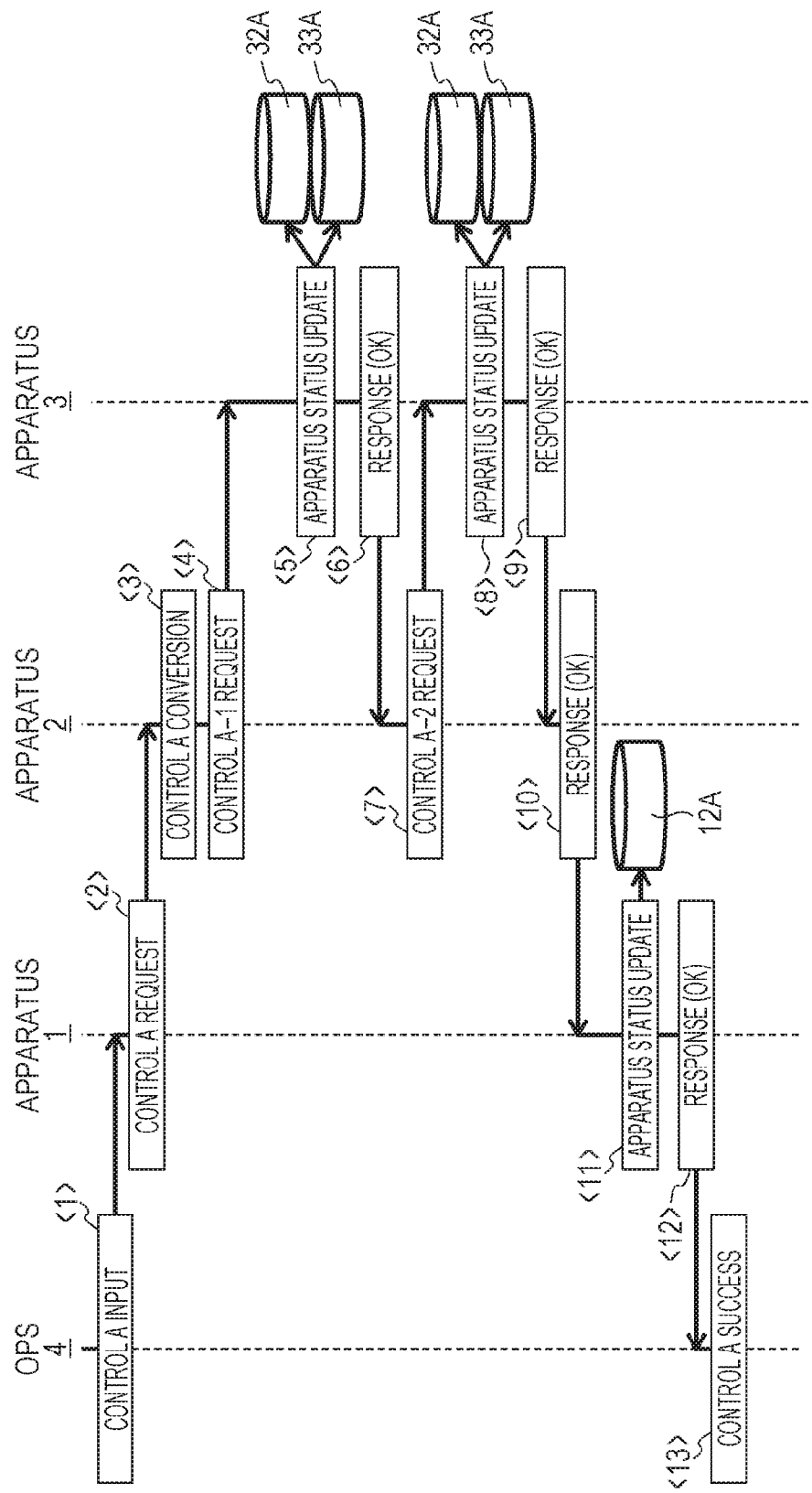
FIG. 2 is a diagram illustrating an example of an operation performed by a system illustrated in FIG. 1.

FIG. 2 illustrates an example of an operation performed by the system illustrated in FIG. 1. When the maintainer inputs the control A to the OPS 4 (<1> in FIG. 2), the information of the control A is transmitted to the apparatus 1. The apparatus 1 by which the information on control A is received transmits the execution request for the control A to the apparatus 2 (<2> in FIG. 2). The apparatus 2 by which the execution request for the control A is received translates the control A and converts the control A to the controls A-1 and A-2 (<3> in FIG. 2). The apparatus 2 sends the execution request for the control A-1 out of the controls A-1 and A-2, to the apparatus 3 (<4> in FIG. 2).

The apparatus 3 executes the control A-1, and, when the control A-1 finishes normally, updates the apparatus status (hardware control information 32A and apparatus configuration information 33A) based on the execution results of the control A-1 (<5> in FIG. 2). The apparatus 3 returns a response indicating the normal finish (OK) of the control A-1 to the apparatus 2 (<6> in FIG. 2). Then, the apparatus 2 sends the execution request for the control A-2 to the apparatus 3 (<7> in FIG. 2).

The apparatus 3 executes the control A-2. When the control A-2 finishes normally, the apparatus 3 updates the apparatus status (hardware control information 32A and apparatus configuration information 33A) based on the execution results of the control A-2 (<8> in FIG. 2). The apparatus 3 returns a response indicating the normal finish (OK) of the control A-2 to the apparatus 2 (<9> in FIG. 2). In this way, the apparatus 2 sends the execution request corresponding to one of the plurality of controls obtained according to the conversion, to the apparatus 3, and, when a normal finish response is obtained from the apparatus 3, sends an execution request for the next control to the apparatus 3. Such a procedure is performed with respect to all of the plurality of controls.

When the apparatus 2 receives the response indicating an execution result of "OK" for the control A-2 from the apparatus 3, since all of the converted controls A-1 and A-2 finish normally, the apparatus 2 returns the response indicating a normal finish (OK) of the control A to the apparatus 1 (<10> in FIG. 2). The apparatus 1 receives the response and updates the apparatus status (apparatus management information 12A) of the apparatus 1 (<11> in FIG. 2). In so doing, the integrity of the apparatus status of the apparatus 3 and the apparatus status of the apparatus 1 is maintained.

The apparatus 1 transmits information indicating the success (OK) of the control A to the OPS 4 (<12> in FIG. 2). The OPS 4 displays information indicating the success of the control A on a screen provided for the OPS 4 (<13> in FIG. 2). Thereby, it is possible for the maintainer to know that the control A succeeds for the apparatus 3.

Figure 3:
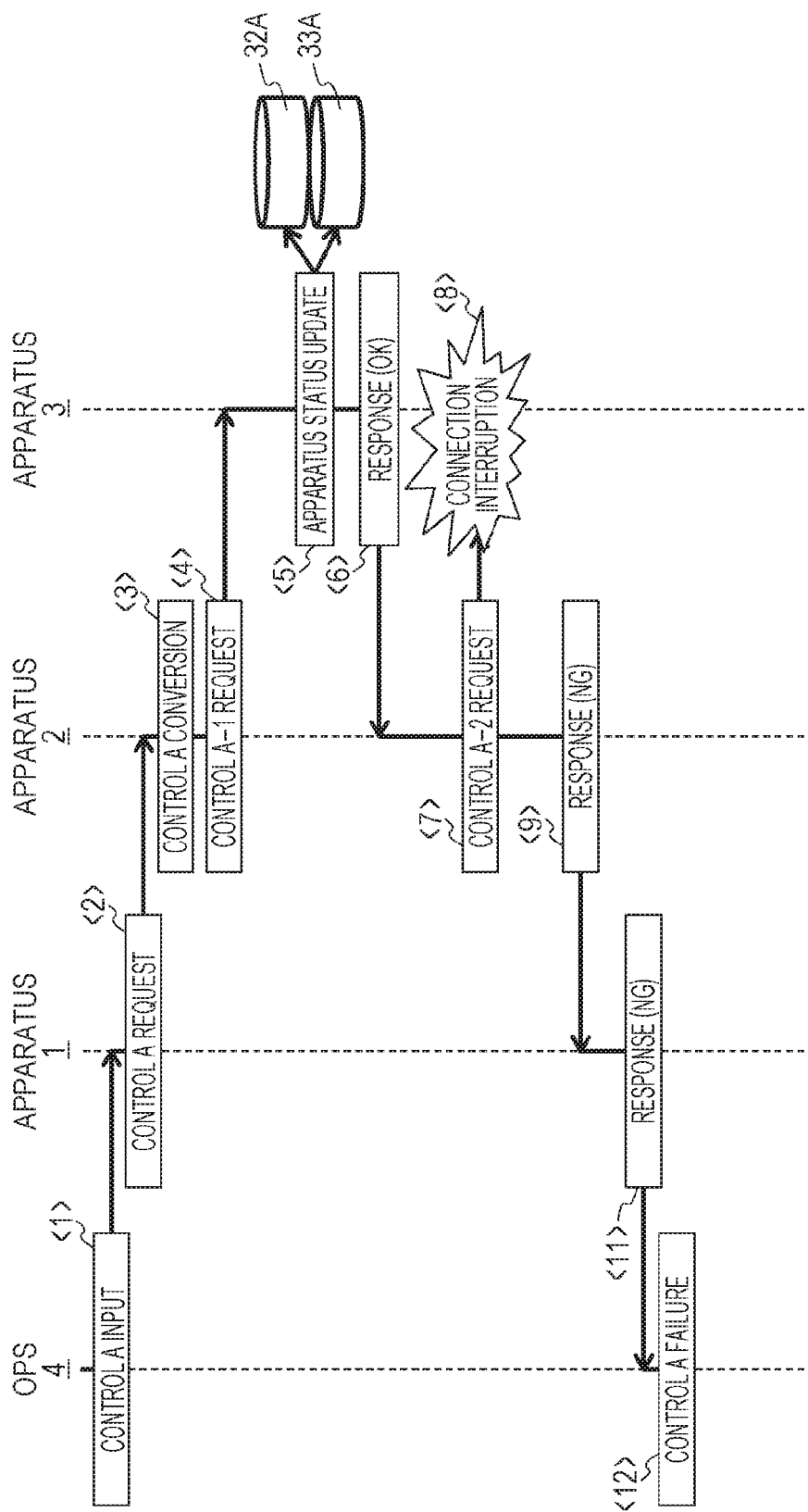
FIG. 3 is a diagram illustrating an example of problematic features of the reference example.

FIG. 3 is an explanatory diagram of problematic features of the reference example. <1> to <7> in FIG. 3 is the same procedure as FIG. 2. However, in FIG. 3, prior to transmission of the execution request for the control A-2 in <7>, transmission faults (disconnection of the communication link between apparatuses) occur between the apparatus 2 and the apparatus 3, and the execution request for the control A-2 does not reach the apparatus 3 (<8> in FIG. 3). The communication fault occurs with a communication circuit fault (link error) between the apparatuses 2 and 3, a hardware fault (hard error) in the apparatus 3, a software error (soft error) in the apparatus 3, or the like as a cause.

The apparatus 2 sets a response standby timer for each time the execution request is transmitted to the apparatus 3. In the example in FIG. 3, because the execution request for the control A-2 does not reach the apparatus 3, the apparatus 2 is unable to obtain a response with respect to the execution request for the control A-2 before the expiration of the timer. The apparatus 2 returns a response indicating that the execution of the control A is a failure (NG) to the apparatus 1 when the timer expires (<9> in FIG. 3).

Since the control A is a failure, the apparatus 1 transmits information indicating the failure (NG) of the control A to the OPS 4 without updating the apparatus management information 12A (<11> in FIG. 3). The OPS 4 displays information indicating the failure of the control A on the screen provided for the OPS 4 (<12> in FIG. 3). Thereby, it is possible for the maintainer to know that the control A fails for the apparatus 3.

In the case in FIG. 3, in the apparatus 3, since the execution of the control A-1 is successful, the apparatus status (hardware control information 32A and apparatus configuration information 33A) of the apparatus 3 is updated (reflecting the execution results of the control A-1). In contrast, in the apparatus 1, a response that the control A is a failure is received and the apparatus status (apparatus management information 12A) of the apparatus 3 managed by the apparatus 1 is not updated. Accordingly, a mismatch between the apparatus status held by the apparatus 3 and the apparatus status managed by the apparatus 1 arises.

In a case where a mismatch arises, it is thought that the hardware control information 32A and apparatus configuration information 33A return to the status prior to execution of the control A-1. However, in a case where the control of the apparatus 3 fails, the apparatus 1 is only notified of the failure of the control A by the apparatus 3, and the apparatus 1 maintains the apparatus status of the apparatus 3 prior to execution of the control A. Therefore, the maintainer is unable to remotely perceive at what stage the controls A-1 to A-n finish in the apparatus 3. Accordingly, in a case of resolving the mismatch, the maintainer travels to the installation position of the apparatus 3, verifies the apparatus status of the apparatus 3, and returns the apparatus status of the apparatus 3 to the status prior to execution of the control A-1 with a manual operation. Such a recovery task is troublesome.

Below a system capable of easily resolving mismatches arising between apparatuses will be described as an embodiment. In the following description of the embodiment, that same constituent elements as the reference example are given the same references.

Embodiment

System Configuration

Figure 4:
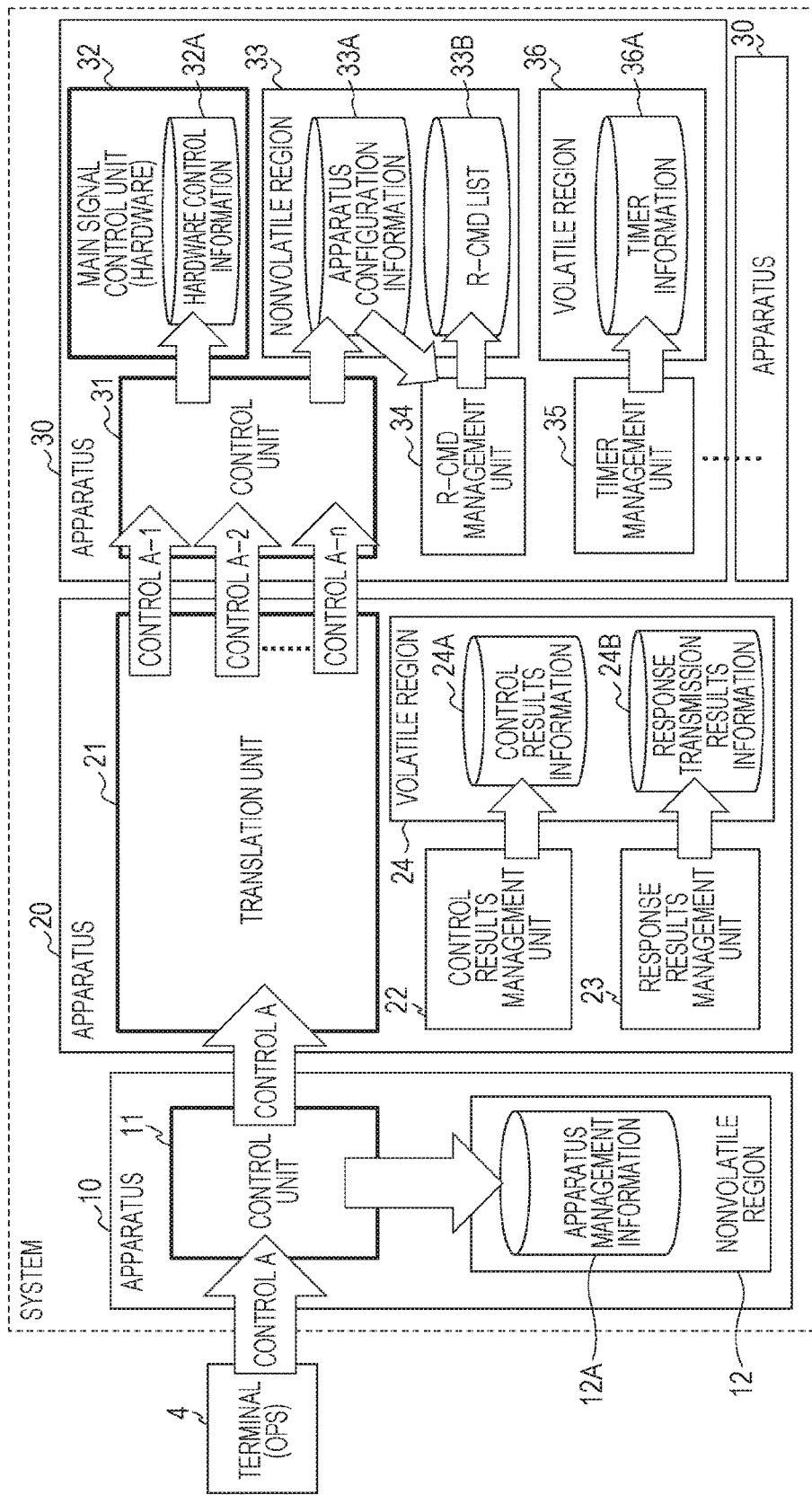
FIG. 4 is a diagram illustrating a configuration example of a system, according to an embodiment.

FIG. 4 illustrates a configuration example of a system (apparatus status recovery system) according to an embodiment. The system illustrated in FIG. 4 includes a frame transmission apparatus 10 (below, referred to as "apparatus 10") that supports 40 GbE, a translation apparatus 20 (below, referred to as "apparatus 20"), and a frame transmission apparatus 30 (below, referred to as "apparatus 30) that supports 100 GbE. In FIG. 4, although a plurality of apparatuses 30 is provided, the system may include a single apparatus 30. The apparatuses 10 and 20, and the apparatus 20 and each apparatus 30, are each connected via a communication circuit (network), and mutual communication is possible therebetween. The communication circuit is, for example, a Local Area Network (LAN). The apparatus 10 is an example of the "first apparatus", the apparatus 20 is an example of the "second apparatus", and the apparatus 30 is an example of the "third apparatus".

The apparatus 10 corresponds to the apparatus 1 in the reference example. The apparatus 10 is connected to the OPS 4. The apparatus 10 includes a control unit 11 and a nonvolatile region 12. The nonvolatile region 12 stores apparatus management information 12A. Since the configuration of the apparatus 10 is the same configuration as the apparatus 1, description will not be repeated.

The nonvolatile region 12 is an example of the "first memory", and the apparatus management information 12A is an example of the "first apparatus-status indicating a status of the third apparatus".

The apparatus 20 corresponds to the apparatus 2 in the reference example. The apparatus 20 includes a translation unit 21 having the same function and configuration as the translation unit 21 included in the apparatus 2, a management unit 22 (control results management unit 22) for managing the control results of the apparatus 30, a management unit 23 (response results management unit 23) for managing the response results from the apparatus 20 to the apparatus 10, and a volatile region 24.

The translation unit 21 converts the control (for example, control A) requested from the apparatus 10 to a plurality of controls (controls A-1 to A-n) compatible with the apparatus 30. The volatile region 24 stores the control results information 24A of the apparatus 30 and the response transmission results information 24B from the apparatus 20 to the apparatus 10. The control results information 24A is information indicating the control results of the apparatus 30, and the response transmission results information 24B is information indicating the response results (success (OK) or failure (NG)) transmitted from the apparatus 20 to the apparatus 10.

The control (for example, control A) requested from the apparatus 10 is an example of the "first control command", and the plurality of second controls (controls A-1 to A-n) converted by the translation unit 21 is an example of the "plurality of second control commands".

The apparatus 30 corresponds to the apparatus 3 in the reference example. The apparatus 30 includes a control unit 31, a main signal control unit 32, and a nonvolatile region 33 that have the same functions and configurations as the apparatus 3. The apparatus 30 further includes a management unit (R-CMD management unit) 34 for a reverse command (R-CMD), a management unit 35 (timer management unit 35) for the timer, and a volatile region 36. The volatile region 36 stores the timer information 36A. A list 33B for reverse commands (R-CMD list 33B) is stored in the nonvolatile region 33 of the apparatus 30 in addition to the apparatus configuration information 33A.

The nonvolatile region 33 is an example of the "second memory". The hardware control information 32A and apparatus configuration information 33A are examples of the "second apparatus-status information indicating a status of the third apparatus".

R-CMD Management Unit 34

Figure 5:
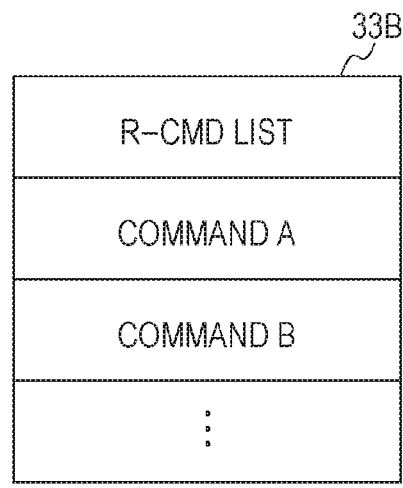
FIG. 5 is a diagram illustrating an example of a data structure of an R-CMD list, according to an embodiment.
Figure 6:
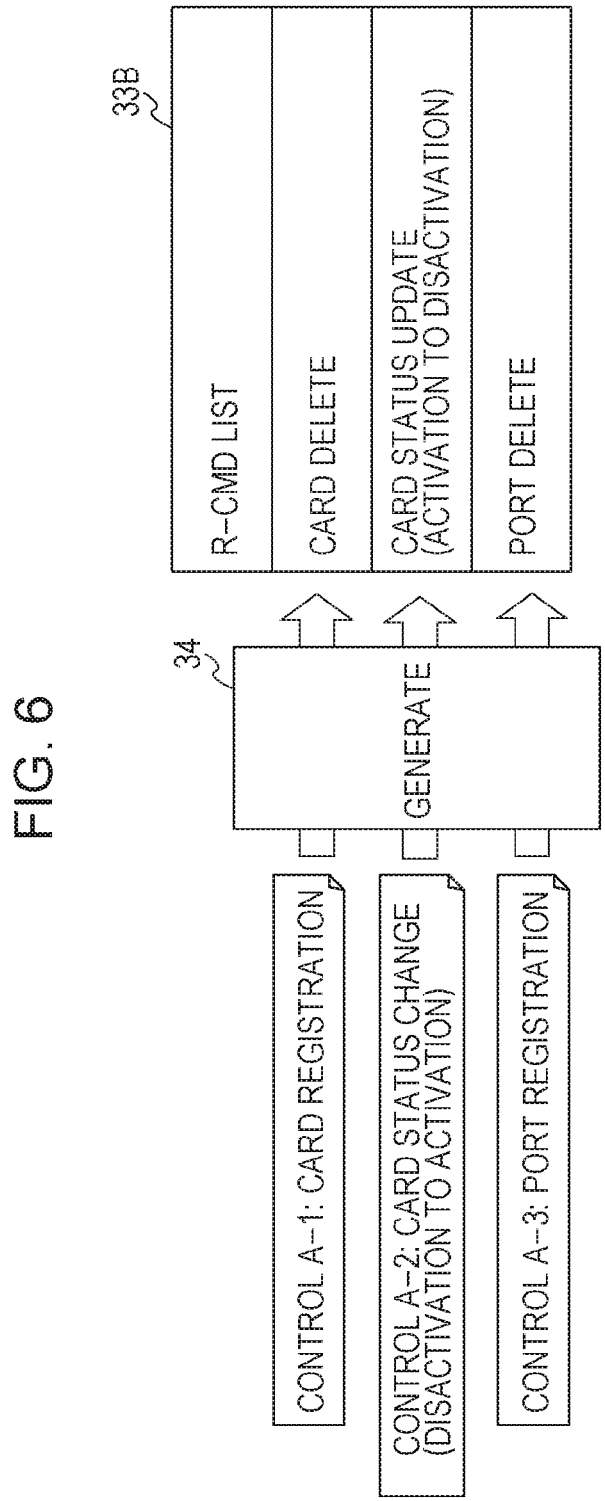
FIG. 6 is a diagram illustrating an example of generation of a reverse command (R-CMD) list, according to an embodiment.

The R-CMD management unit 34 generates a reverse command corresponding to each control received from the apparatus 20 and registers the reverse command in the R-CMD list 33B. FIG. 5 illustrates a data structure example of the R-CMD list 33B. FIG. 6 is an explanatory diagram according to the generation of the R-CMD list 33B.

As illustrated in FIG. 5, reverse commands (in the example in FIG. 5, command A and command B) corresponding to each control are stored in the R-CMD list 33B. The reverse command is a control command that returns the hardware control information 32A and apparatus configuration information 33A updated as a result of the control to the content (status) prior to the control. That is, the reverse command is a command that "returns the execution results of each second command to prior to execution".

The R-CMD management unit 34 receives the hold notification (R-CMD hold notification) of the reverse command from the control unit 31 when control is performed in accordance with the command instruction received by the control unit 31 from the apparatus 20. The management unit 34 generates the reverse command according to the content of the control and registers the reverse command in the list 33B.

In the example in FIG. 6, the content of the control A-1 is the "card registration", the content of the control A-2 is the "card status update (change from disactivation to activation)", and the content of the control A-3 is the "port registration". The R-CMD management unit 34 generates a reverse command of "card deletion" as the reverse command corresponding to the "card registration" and registers the reverse command in the list 33B. The R-CMD management unit 34 generates a reverse command of "card status update (change from activation to disactivation")" as the reverse command corresponding to the "card status update (change from disactivation to activation)" and registers the reverse command in the R-CMD list 33B. The R-CMD management unit 34 generates a reverse command of "port deletion" as the reverse command corresponding to the "port registration" and registers the reverse command in the list 33B.

Here, the wording "card" refers to an apparatus in which the external appearance is card-like mounted to a shelf-type transmission apparatus. In the wording "card", a module for executing predetermined function or process provided in the transmission apparatus is implemented. The module is formed by at least one of an electronic component, an electronic device, and a physical apparatus, or a combination of two or more thereof. The "card" is also referred to as a "functional card". There are also cases where the "card" is referred to as a "panel", "board", "package", "plug in unit (PIU)" or the like.

In a case where the card is mounted with a communication interface circuit or a communication module that accommodates a communication circuit, the card is referred to as an "interface card". The interface card has a plurality of ports for accommodating the communication circuit. The wording "card registration" is a control (process) for placing the "card" mounted to the housing of the transmission apparatus under management of the apparatus 30, and the wording "card deletion" is a control (process) that deletes the "card" from the management of the apparatus 30.

The wording "card status update" is a control (process) for causing the "card" to transition between the disactivation status (inoperable status) and the activation status (operable status). The wording "card registration" is a control (process) in which a predetermined port is added to the management target, and the wording "port deletion" is a control (process) that removes the predetermined port from the management target. However, the control content according to these cards is an example.

The R-CMD management unit 34 receives the application notification (R-CMD application notification) of the reverse command that is transmitted from the timer management unit 35, and the control results management unit 22 and the response results management unit 23 of the apparatus 20. In this case, the R-CMD management unit 34 performs a check of whether there is a reverse command corresponding to the R-CMD application notification in the R-CMD list 33B. In a case where there is a corresponding reverse command in the R-CMD list 33B, the R-CMD management unit 34 executes the reverse command.

The control unit 31 performs a process (referred to as a "recovery process") that returns the status of the main signal control unit 32, and the hardware control information 32A and apparatus configuration information 33A, to the status prior to the control corresponding to the reverse command, through execution of the reverse command. Through the recovery process, the apparatus status in the apparatus 30 is recovered to before the control. Accordingly, it is possible for mismatches in apparatus status between the apparatuses 30 and 10 to be automatically resolved. When the recovery process finishes, the R-CMD management unit 34 deletes the corresponding reverse command from the R-CMD list 33B.

The R-CMD management unit 34 receives the R-CMD application notification from the control unit 31 when the apparatus 30 restarts. In this case, the R-CMD management unit 34 searches the R-CMD list 33B for the reverse command corresponding to the R-CMD application notification. In a case where the corresponding reverse command is found in the R-CMD list 33B, the R-CMD management unit 34 executes the reverse command and performs the recovery process. Thereby, even in a case where an abnormality such as a power interruption occurs during execution of a given command in the apparatus 30 and a mismatch in the apparatus statuses occurs between the apparatuses 30 and 10 as a result, it is possible for the mismatch to be resolved.

In a case where a reverse command discard notification (R-CMD discard notification) is received from the control results management unit 22, the R-CMD management unit 34 erases the reverse command corresponding to the control from the R-CMD list 33B. Thereby, the unnecessary data is deleted from the nonvolatile region 33 and it is possible for the capacity of the nonvolatile region 33 to be increased.

Timer Management Unit 35

Figure 7:
FIG. 7 is a diagram illustrating an example of a data structure of timer information, according to an embodiment.

The timer management unit 35 generates timer information 36A and stores the timer information in the volatile region 36. FIG. 7 illustrates a data structure example of the timer information 36A. As illustrated in FIG. 7, the timer information 36A is managed in a table format as an example. The timer information 36A includes a control start time and a reception standby timer. The control start time indicates the start time of the initial control (control A-1) out of the series of controls obtained by the conversion by the apparatus 20. The reception standby timer is a reception standby timer for the above-described R-CMD application notification and the R-CMD discard notifications. The timer management unit 35 performs management of the reception standby timer (clocking start, clocking stop).

When the control start notification is received from the control unit 31, the timer management unit 35 registers the control start time as the timer information 36A, and starts clocking of the reception standby timer. The expiration time of the reception standby timer may be set, as appropriate. Before the expiration of the reception standby timer, in a case where the timer discard notification is received, the timer management unit 35 stops the clocking of the reception standby timer. In contrast, in a case where the reception standby timer expires, the timer management unit 35 sends the R-CMD application notification to the R-CMD management unit 34.

Through such a configuration, when the reception standby timer expires, the R-CMD management unit 34 causes the control unit 31 to execute the reverse command. For example, when the connection between the apparatuses 20 and 30 is disconnected, communication between the apparatuses 20 and 30 is not possible. In this case, the plurality of controls finish abnormally since the apparatus 20 is unable to receive the results of the control from the apparatus 30 or the apparatus 30 is unable to receive the request for the next control from the apparatus 20. In such a case, the reverse command is executed triggered by the reception standby timer expiring, and it is possible to resolve mismatches in the apparatus statuses.

Control Results Management Unit 22

Figure 8:
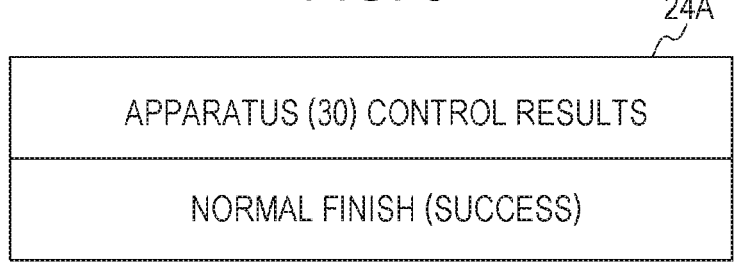
FIG. 8 is a diagram illustrating an example of control results information, according to an embodiment.

The control results management unit 22 manages the control results information 24A stored in the volatile region 24. FIG. 8 is an explanatory diagram of the control results information 24A. The control results information 24A is information indicating whether the control results with respect to the apparatus 30 is a normal finish (success) or an abnormal finish (failure).

The control results management unit 22 stores "normal finish (control success)" in the volatile region 24 as the control results information 24A in a case where a normal finish notification is received for all of the series of controls (controls A-1 to A-n) to the apparatus 30, which are obtained through the conversion by the apparatus 20. In contrast, in a case where the normal finish notification is not obtained for all of the series of controls, the control results management unit 22 stores "abnormal finish (control failure)" as the control results information 24A in the volatile region 24.

The control results management unit 22 sends the normal finish notification to the response results management unit 23 in a case where all of the series of controls finish normally for the apparatus 30. In contrast, in a case where the series of controls finish abnormally, the apparatus 20 stops the control for the apparatus 30. In this case, the control results management unit 22 sends the abnormal finish notification to the response results management unit 23, sends the R-CMD application notification for the R-CMD management unit 34, and sends the timer discard notification to the timer management unit 35.

Response Results Management Unit 23

Figure 9:
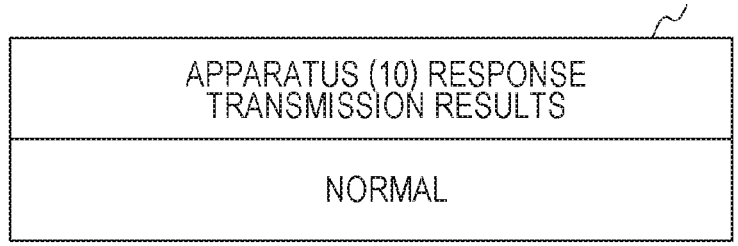
FIG. 9 is a diagram illustrating an example of response transmission results information, according to an embodiment.

The response results management unit 23 sends the control results information 24A (normal finish) to the apparatus 10 as a response for the control request from the apparatus 10 in a case where the normal finish notification is obtained from the control results management unit 22. The response results management unit 23 stores the fact that the response transmission has finished normally, as the response transmission results information 24B, in the volatile region 24 in a case where the fact that the response transmission has finished normally is received from the apparatus 10. FIG. 9 is an explanatory diagram of the response transmission results information 24B. As illustrated in FIG. 9, the information indicating whether the response transmission to the apparatus 10 finished normally (normal or abnormal) is stored as the response transmission results information 24B.

In a case where the response transmission results information 24B indicates "normal" and the control results information 24A indicates "normal finish", the response transmission results management unit 23 sends the R-CMD discard notification to the R-CMD management unit 34 and sends the timer discard notification to the timer management unit 35.

In a case where, on the one hand, the response transmission results information 24B indicates "normal" and the control results information 24A indicates an "abnormal finish", the response results management unit 23 does not particularly perform the process. In a case where the response transmission results information 24B indicates "normal", the response transmission results management unit 23 sends the R-CMD discard notification for the R-CMD management unit 34 and sends the timer discard notification for the timer management unit 35.

System Hardware Configuration

Figure 10:
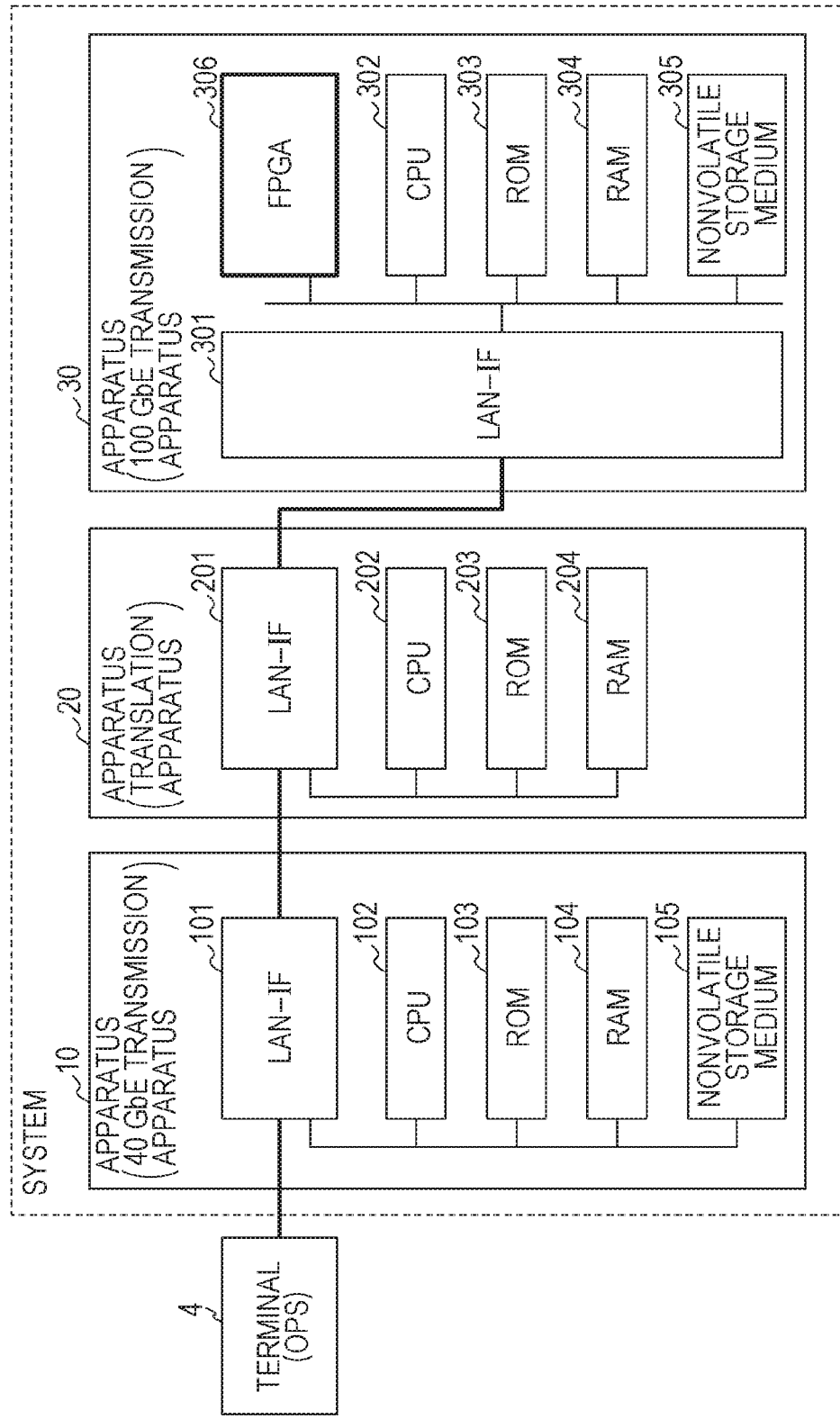
FIG. 10 is a diagram illustrating an example of a hardware configuration of a system, according to an embodiment.

Next, description will be given of a hardware configuration example of the system (apparatus 10, apparatus 20, apparatus 30) illustrated in FIG. 1. FIG. 10 illustrates a hardware configuration example of the system. In FIG. 10, the apparatus 10 includes a LAN interface circuit (LAN-IF) 101, a central processing unit (CPU) 102, a read only memory (ROM) 103, a random access memory (RAM) 104, and a nonvolatile storage medium 105, which are connected to each other via a bus.

The LAN-IF 101 handles the physical layer (PHY) and media access control (MAC), and administers the communication between the OPS 4 and the apparatus 20. It is possible to apply a LAN card or network interface card (NIC) to the LAN-IF 101.

The ROM 103 stores programs executed by the CPU 102 or data used during execution of the programs. RAM 104 is used as a work region for the CPU 102, a storage region for the data, and a buffer region for data according to the communication.

The nonvolatile storage medium 105 is a hard disk drive (HDD), a solid state drive (SSD) a flash memory, an electrically erasable programmable read-only memory (EEPROM), or the like. The nonvolatile storage medium 105 is able to include a storage medium having portability such as a disk storage medium or a USB memory. The nonvolatile storage medium 105 stores programs executed by the CPU 102 and data used during execution of the program.

The CPU 102 performs operations as the apparatus 10 by loading into the RAM 104 and executing the program stored in the ROM 103 or the nonvolatile storage medium 105. That is, the CPU 102 operates as the control unit 11 illustrated in FIG. 4 by executing the program. The nonvolatile storage medium 105 is used as the nonvolatile region 12 illustrated in FIG. 4, and stores the apparatus management information 12A.

The CPU 102 that operates as the control unit 11 generates a control instruction (request for control A) based on the information of the control (for example, control A) from the OPS 4 received by the LAN-IF 101, and sends the control instruction to the apparatus 20 via the LAN-IF 101. The CPU 102 updates the apparatus management information 12A (apparatus status) stored in the nonvolatile storage medium 105 in a case where the response to the control instruction (control request) received by the LAN-IF 101 indicates control success. The CPU 102 sends information indicating the result of the control to the OPS 4 via the LAN-IF 101.

The apparatus 20 includes a LAN-IF 201, a CPU 202, a ROM 203, and a RAM 204, which are connected to each other via a bus. It is possible for the LAN-IF 201, the CPU 202, the ROM 203, and the RAM 204 to have the same functions and configuration as the LAN-IF 101, the CPU 102, the ROM 103, and the RAM 104.

The CPU 202 operates as the translation unit 21, the control results management unit 22, and the response results management unit 23 illustrated in FIG. 4, by loading into the RAM 204 and executing the programs stored in the ROM 203. The RAM 204 is used as the volatile region 24 illustrated in FIG. 4, and stores the control results information 24A and the response transmission results information 24B.

For example, the CPU 202 that operates as the translation unit 21 converts a request for the control (for example, a request for the control A) to a plurality of controls (controls A-1 to A-n) compatible with the apparatus 30. The CPU 202 generates control instructions (control requests) respectively corresponding to the controls A-1 to A-n, and sends the control instructions to the apparatus 30 via the LAN-IF 201.

The apparatus 30 includes a LAN-IF 301, a CPU 302, a ROM 303, a RAM 304, a nonvolatile storage medium 305, and a field programmable gate array (FPGA) 306, which are connected to each other via a bus. It is possible for the LAN-IF 301, the CPU 302, the ROM 303, the RAM 304, and the nonvolatile storage medium 305 to have the same functions and configuration as the LAN-IF 101, the CPU 102, the ROM 103, the RAM 104, and the nonvolatile storage medium 105.

The FPGA 306 is an example of hardware that performs the process for the main signal treated by the transmission apparatus 30, and corresponds to the main signal control unit 32 illustrated in FIG. 1. The FPGA 306 includes a memory, and the hardware control information 32A is stored in the memory.

The CPU 302 operates as the control unit 31, the R-CMD management unit 34, and the timer management unit 35 illustrated in FIG. 4, by loading into the RAM 304 and executing the programs stored in the ROM 303. The nonvolatile storage medium 305 is used as the nonvolatile region 33 illustrated in FIG. 4, and stores the apparatus configuration information 33A and the R-CMD list 33B. The RAM 204 is used as the volatile region 36 illustrated in FIG. 4, and stores the timer information 36A.

Each of the CPUs 102, 202, and 302 is an example of the "processor", the "control apparatus", the "controller", and the "control unit". Each of the ROMs 103, 203, and 303, the RAMs 104, 204, and 304, and the nonvolatile storage media 105, and 305 is an example of the "memory", the "storage apparatus", and the "storage medium".

At least a portion of the processes performed by the CPU 102, 202, and 302 may be performed by a semiconductor device such as a digital signal processor (DSP), a programmable logic device (PLD) such as an FPGA, and an integrated circuit (such as IC, LSI, application specific integrated circuit (ASIC)).

Processing Flow

Next, the processing flow of the R-CMD management unit 34, the timer management unit 35, the control results management unit 22, and the response results management unit 23 will be described.

Process of R-CMD Management Unit (CPU 302)

Figure 11:
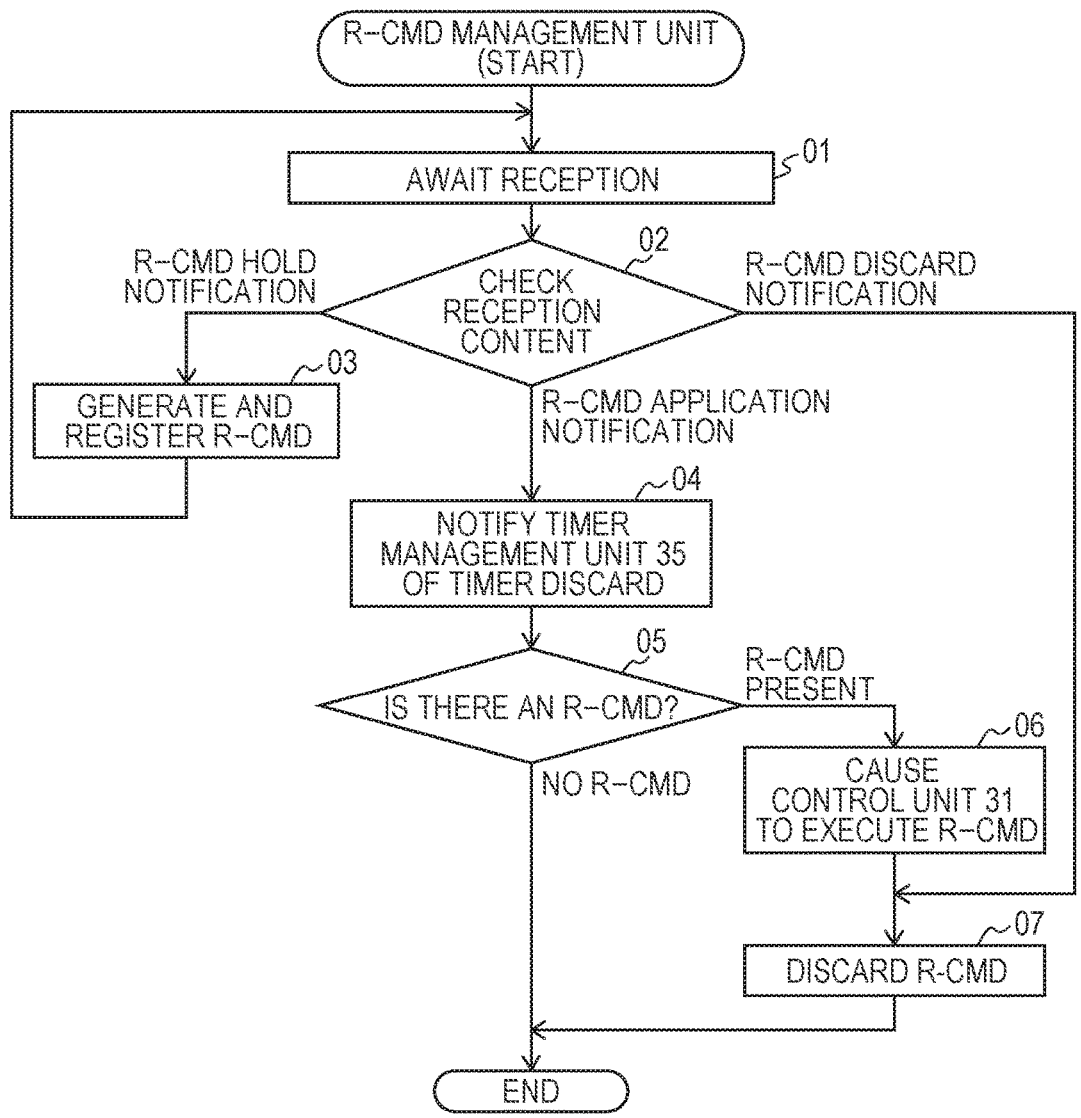
FIG. 11 is a diagram illustrating an example of an operational flowchart for processing of an R-CMD management unit, according to an embodiment.

FIG. 11 is an operational flowchart illustrating a processing example of the R-CMD management unit 34. The process of FIG. 11 is executed by the CPU 302. In 01, the R-CMD management unit 34 awaits the reception of a notification and when the notification is received, the process proceeds to 02.

In 02, the R-CMD management unit 34 performs a check on the received content. When the notification is an R-CMD hold notification, the process proceeds to 03. When the notification is an R-CMD application notification, the process proceeds to 04. When the notification is an R-CMD discard notification, the process proceeds to 07.

In a case where the process proceeds to 03, the R-CMD management unit 34 generates a reverse command corresponding to the control and registers the reverse command in the R-CMD list 33B. Thereafter, the process returns to 01.

In a case where the process proceeds to 04, the R-CMD management unit 34 sends a timer discard notification to the timer management unit 35. In 05, the R-CMD management unit 35 references the R-CMD list 33B, and determines whether the reverse command corresponding to the R-CMD application notification is registered in the R-CMD list 33B. In a case where the corresponding reverse command is registered in the R-CMD list 33B, the process proceeds to 06. In a case where the corresponding reverse command is not registered in the R-CMD list 33B, the R-CMD management unit 35 finishes the process in FIG. 11 without particularly performing the process.

In 06, the R-CMD management unit 34 causes the control unit 31 to execute the reverse command. The control unit 31 performs control (for example, "card deletion") designated by the reverse command, and returns the status of the main signal control unit 32 (hardware) to the status before the control (for example, "card registration") corresponding to the reverse command. Accompanying this, the control unit 31 causes the hardware control information 32A and apparatus configuration information 33A to be recovered to the status (status before card registration) before the control. Thereafter, the process returns to 07.

In 06, in a case where a plurality of reverse commands is registered in the R-CMD list 33B, the R-CMD management unit 34 causes the control unit 31 to execute the processes corresponding to each reverse command in reverse order to the registration order of the reverse commands. Thereby, the apparatus status of the apparatus 30 is finally returned to the status prior to the start of the initial control (A-1 from A-1 to A-n) out of the series of controls. In 07, the R-CMD management unit 34 deletes (discards) the reverse command registered in the R-CMD list 33B. After 07 finishes, the process in FIG. 11 finishes.

Processing Flow of Timer Management Unit 35 (CPU 302)

Figure 12:
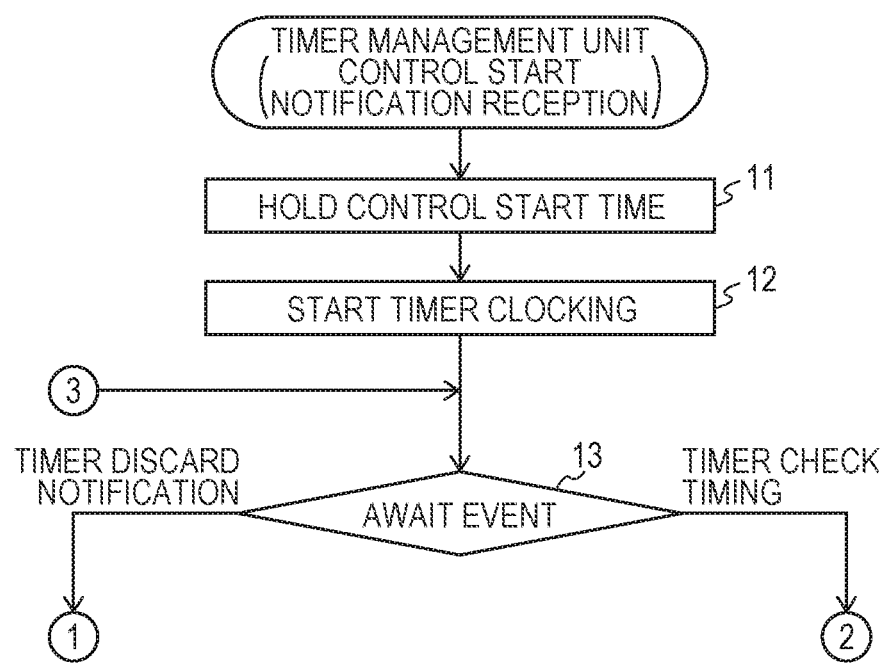
FIG. 12 is a diagram illustrating an example of an operational flowchart for processing of a timer management unit, according to an embodiment.
Figure 13:
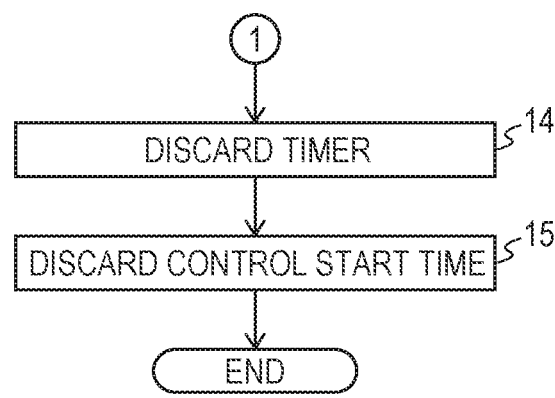
FIG. 13 is a diagram illustrating an example of an operational flowchart for processing of a timer management unit, according to an embodiment.
Figure 14:
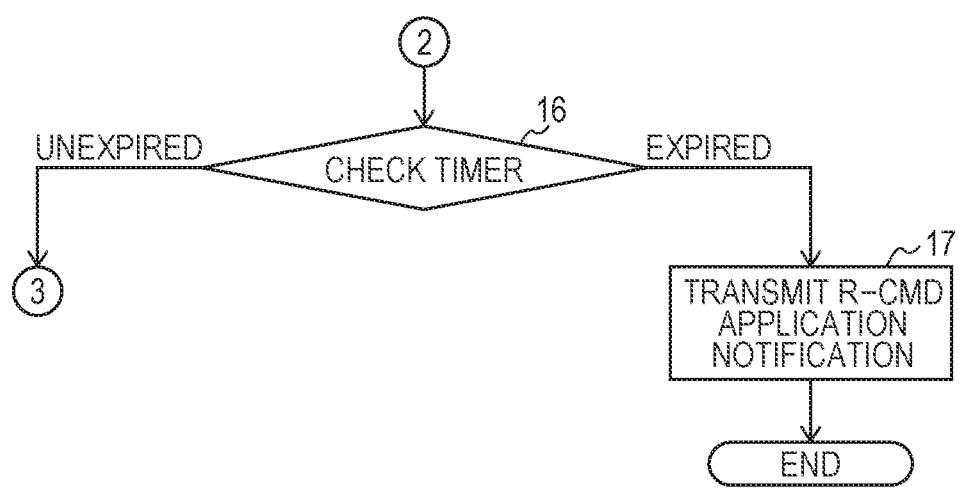
FIG. 14 is a diagram illustrating an example of an operational flowchart for processing of a timer management unit, according to an embodiment.

FIGS. 12, 13, and 14 are operational flowcharts illustrating a processing example of the timer management unit 35. The process illustrated in FIGS. 12 to 14 is executed by the CPU 302 that operates as the timer management unit 35. The process illustrated in FIG. 12 is started by the timer management unit 35 receiving the control start notification from the control unit 31.

In 11, the timer management unit 35 stores the control start time in the timer information 36A. In 12, the timer management unit 35 starts the clocking of the reception standby timer. The order of the processes in 11 and 12 may be reversed.

In 13, the timer management unit 35 enters a state of awaiting an event. In a case where a timer discard notification is received as the event, the process proceeds to 14 (FIG. 13). In contrast, in a case of reaching a timing at which the value of the reception standby timer is checked as the event (timer check timing), the process proceeds to 16 (FIG. 14).

In 14, the timer management unit 35 discards (deletes) the reception standby timer from the timer information 36A, according to the timer discard notification, thereby causing the clocking by the reception standby timer to be stopped. In 15, the control start time stored as the timer information 36A is discarded.

In 16 of FIG. 14, the timer management unit 35 performs a check of the reception standby timer. For example, the timer management unit 35 determines whether the elapsed time from the control start time (that is, the value of the reception standby timer) exceeds the predetermined expiration time. The predetermined expiration time is stored in advance in the ROM 303 or the nonvolatile storage medium 305. In this way, the timer management unit 35 determines whether the reception standby timer is expired.

Processing Flow of Control Results Management Unit 22 (CPU 202)

Figure 15:
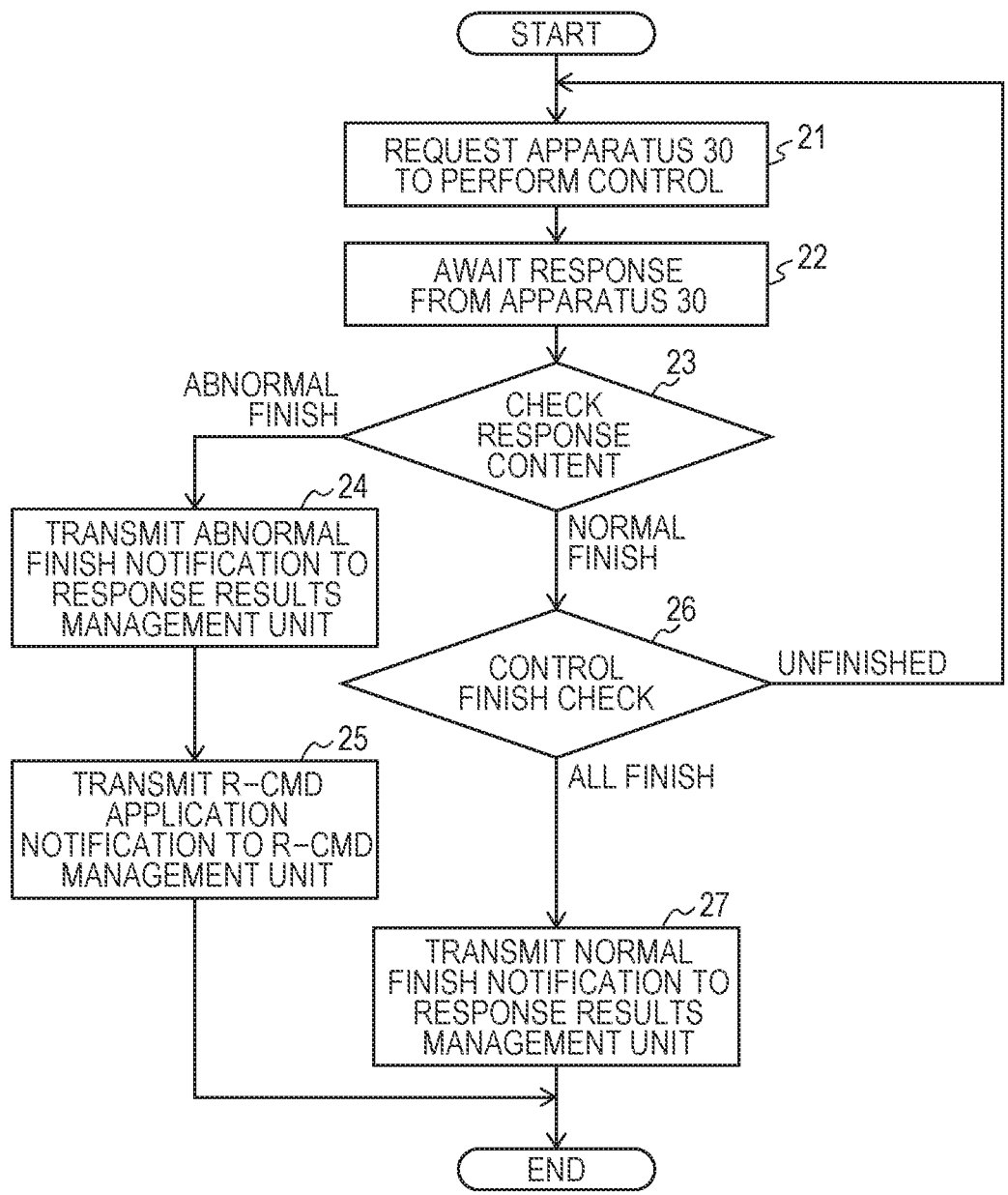
FIG. 15 is a diagram illustrating an example of an operational flowchart for processing of a control result management unit, according to an embodiment.

FIG. 15 is an operational flowchart illustrating a processing example of a control results management unit 22. The process of FIG. 15 is executed by the CPU 202. Prior to the start of the process in FIG. 15, the CPU 202 that operates as the translation unit 21 converts a request for the control (as the control A) from the apparatus 10 to a plurality of controls A-1 to A-n.

In 21, the control results management unit 22 requests the apparatus 30 to perform the initial control (control A-1) out of the plurality of controls (controls A-1 to A-n). In so doing, the information indicating an execution instruction for the control A-1 is transmitted to the apparatus 30 via the LAN-IF 201.

In 22, the control results management unit 22 awaits a response from the apparatus 30. When the response is received, the control results management unit 22 checks the response content (23). At this time, in a case where the response content indicates an abnormal finish of the control requested to perform, the process proceeds to 24. In a case where the response content indicates a normal finish of the control requested to perform, the process proceeds to 26.

For the process in 23, the control results management unit 22 may be configured to set the standby timer for the control request when requesting the control. In a case where the connection with the apparatus 30 is disconnected for any reason, and the response is not received before to the expiration of the standby timer, it is possible for the control results management unit 22 to determine an abnormal finish of the control requested to perform. In this way, it is possible for the determination of the abnormal finish performed by the control results management unit 22 to include at least one of a case where the response content indicates the abnormal finish and a case where a response is not obtained from the apparatus 30.

In 24, the control results management unit 22 sends the abnormal finish notification to the response results management unit 23. In 25, the control results management unit 22 sends the R-CMD application notification for the R-CMD management unit 34. The R-CMD application notification is transmitted to the apparatus 30 via the LAN-IF 201.

In 26, the control results management unit 22 determines whether all the controls requested to perform by the apparatus 30 are finished. At this time, in a case where all the requested controls have not been finished, the process returns to 21. In 21, the request is created for the control to be next performed. In a case where all the requested controls have finished, the control results management unit 22 sends the normal finish notification to the response results management unit 23 (27).

The control results management unit 22 stores the control results information 24A indicating the control results (abnormal finish or normal finish) in the volatile region 24 (RAM 204) during the processes of 25 and 27. The order of the process in 24 and the process in 25 in FIG. 15 may be reversed. The processes in 21 to 24 and 26 may be performed by the translation unit 21, and the control results management unit 22 may perform the processes in 25 and 27.

Processing Flow of Response Results Management Unit 23 (CPU 202)

Figure 16:
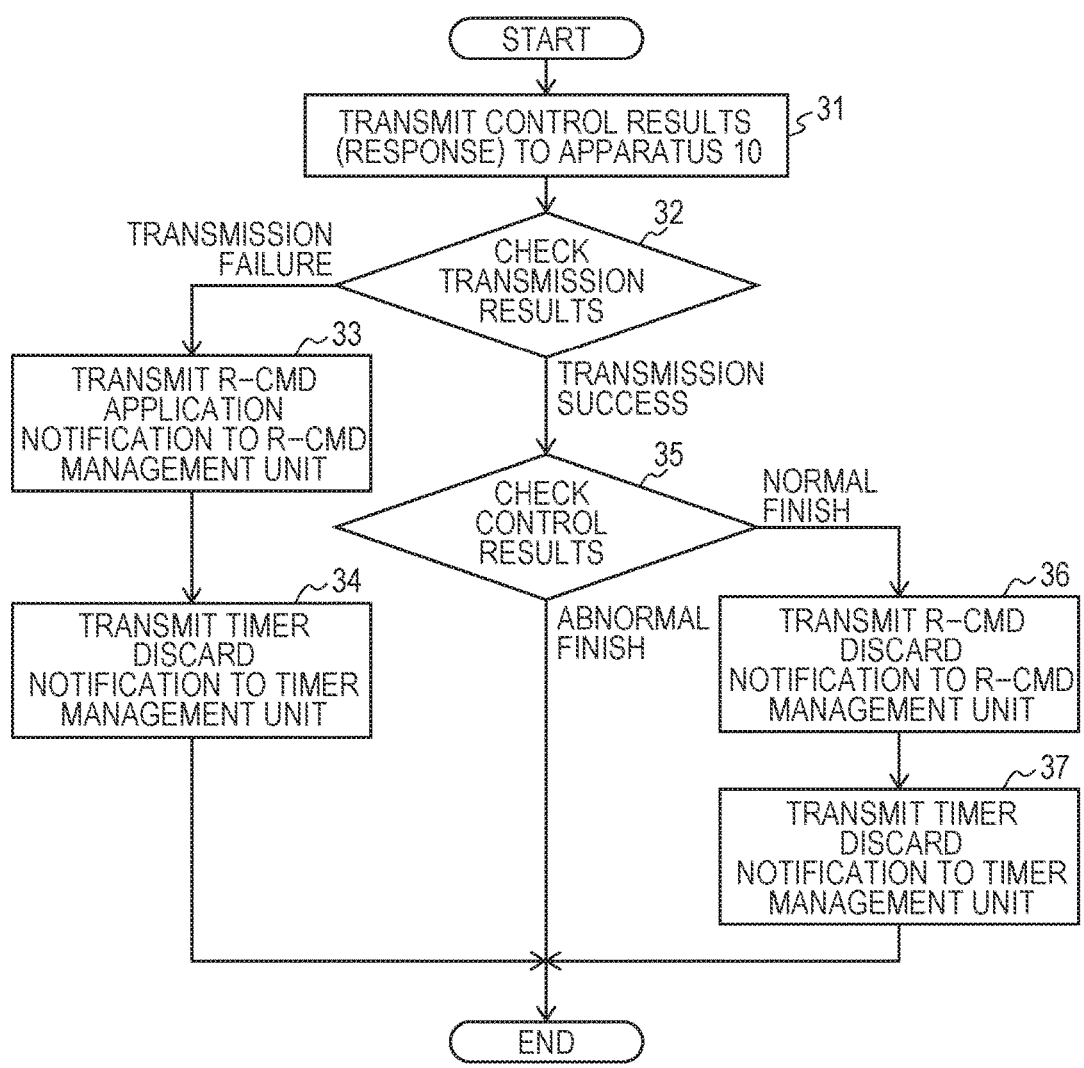
FIG. 16 is a diagram illustrating an example of an operational flowchart for processing of a response result management unit, according to an embodiment.

FIG. 16 is an operational flowchart illustrating a processing example of a response results management unit 23. The process of FIG. 16 is executed by the CPU 202.

In 31, the response results management unit 23 transmits the control results (response with respect to the control request from the apparatus 10) to the apparatus 10. The response is transmitted to the apparatus 10 via the LAN-IF 201. In 32, the response results management unit 23 checks the transmission results. It is possible for the check of the transmission results to be determined by whether a reception verification (response from the apparatus 10) with respect to the response sent in 31 is received by the apparatus 20 within a predetermined time.

In a case where the reception verification is not received, in order to perform a process for the case where the transmission of the response fails, the process proceeds to 33. In a case where the reception verification is received, in order to perform a process for the case where the transmission of the response succeeds, the process proceeds to 35.

In 33, the response results management unit 23 sends the R-CMD application notification for the R-CMD management unit 34. In 34, the response results management unit 23 transmits the timer discard notification for the timer management unit 35. The R-CMD application notification and the timer discard notification are transmitted to the apparatus 30 via the LAN-IF 202. The order of the processes in 33 and 34 may be reversed.

In 35, the response results management unit 23 references the control results information 24A stored in the volatile region 24 (RAM 204), and checks the control results. At this time, when the control results are an abnormal finish, the response results management unit 23 does not particularly perform the process and the process in FIG. 16 finishes. In contrast, when the control results are a normal finish, the process proceeds to 36.

In 36, the response results management unit 23 transmits the R-CMD discard notification for the R-CMD management unit 34. In 37, the response results management unit 23 transmits the timer discard notification for the timer management unit 35. The R-CMD discard notification and the timer discard notification are transmitted to the apparatus 30 via the LAN-IF 202. The order of the processes in 36 and 37 may be reversed.

Operation Example

Next, an operation example in the system of the embodiment will be described.

Operation Example 1

Figure 17:
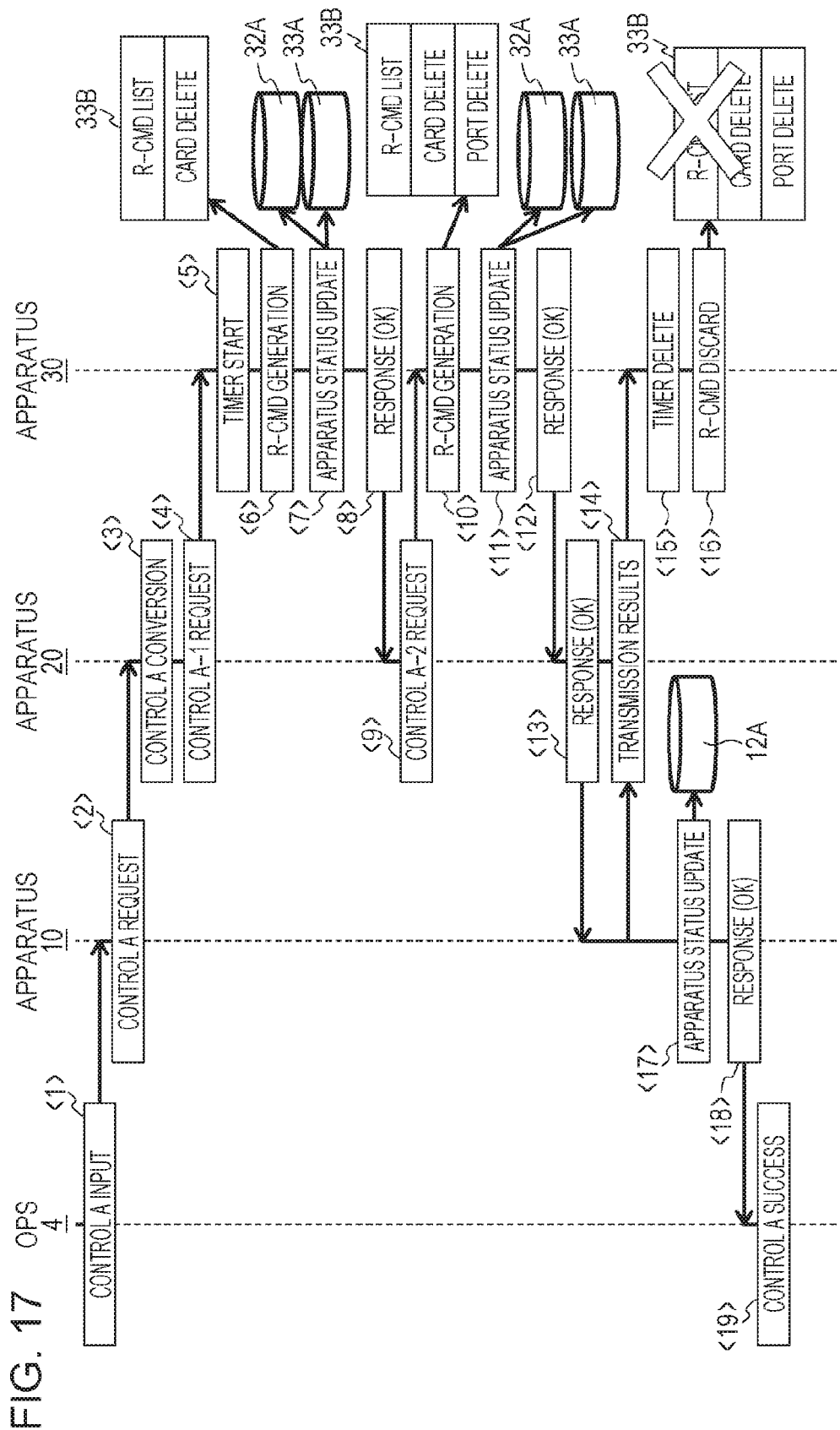
FIG. 17 is a diagram illustrating an example of an operational sequence, according to an embodiment.

FIG. 17 is a sequence diagram illustrating an operation example (Operation Example 1) of the system in a case where the controls A-1 to A-n (example where n=2) corresponding to the control A requested from the apparatus 10 finishes normally. The content of the control A-1 corresponding to the control A is assumed to be "card registration" and the content of the control A-2 is assumed to be "port registration".

In FIG. 17, when the maintainer inputs the control A to the OPS 4 (<1> in FIG. 17), the information of the control A is transmitted to the apparatus 10. In the apparatus 10 by which the information on control A is received, the control unit 11 transmits the execution request for the control A to the apparatus 20 (<2> in FIG. 17).

The translation unit 21 of the apparatus 20 by which the execution request for the control A is received converts the control A to the controls A-1 and A-2 compatible with the apparatus 30 (<3> in FIG. 17). The control results management unit 22 of the apparatus 20 transmits the execution request for the control A-1 out of the controls A-1 and A-2, to the apparatus 30 (<4> in FIG. 17).

The control unit 31 of the apparatus 30 executes the control A-1. At this time, the timer management unit 35 receives the control start notification from the control unit 31, generates the timer information 36A, and starts the reception standby timer (<5> in FIG. 17).

The R-CMD management unit 34 receives the R-CMD hold notification from the control unit 31, generates the reverse command "card deletion" corresponding to the control A-1 "card registration", and registers the reverse command in the R-CMD list 33B (<6> in FIG. 17).

When the control A-1 finishes normally, the control unit 31 updates the hardware control information 32A and apparatus configuration information 33A (<7> in FIG. 17). The control unit 31 transmits a response indicating the control results (normal finish) for the control A-1 to the apparatus 20 (<8> in FIG. 17).

When the control results management unit 22 of the apparatus 20 receives the response (normal finish), the control results management unit 22 transmits the execution request for the next control A-2 to the apparatus 30 (<9> in FIG. 17). The control unit 31 starts execution of the control A-2, and transmits the R-CMD hold notification corresponding to the control A-2 to the R-CMD management unit 34.

The R-CMD management unit 34 generates a reverse command "port deletion" corresponding to the control A-2 "port registration" in accordance with the R-CMD hold notification, and registers the reverse command in the R-CMD list 33B (<10> in FIG. 17). At this point in time, the reverse commands "card deletion" and "port deletion" are registered in the R-CMD list 33B.

When the control A-2 finishes normally, the control unit 31 updates the hardware control information 32A and apparatus configuration information 33A (<11> in FIG. 17). The control unit 31 transmits a response indicating the control results (normal finish) for the control A-2 to the apparatus 20 (<12> in FIG. 17).

When it is determined that the response (normal finish) is received and both of the controls A-1 and A-2 finish, the control results management unit 22 stores the control results information 24A indicating the normal finish in the volatile region 24. The control results management unit 22 sends the normal finish notification to the response results management unit 23 which transmits the response indicating a normal finish of the control A to the apparatus 10 (<13> in FIG. 17). At this time, the response results management unit 23 sets the timer for standby and awaits the reception verification from the apparatus 10.

When the response is received normally by the apparatus 10, the apparatus 10 transmits the reception verification to the apparatus 20. When the reception verification is received before the expiration of the timer, the response results management unit 23 verifies that the control results information 24A indicates a normal finish of the control A. Then, the response results management unit 23 sends the R-CMD discard notification and the timer discard notification to the apparatus 30 (<14> in FIG. 17).

The timer management unit 35 of the apparatus 30 performs the timer deletion in accordance with the timer discard notification. That is, the timer management unit 35 deletes the timer information 36A (<15> in FIG. 17). The R-CMD management unit 34 deletes the registration content of the R-CMD list 33B in accordance with the R-CMD discard notification (<16> in FIG. 17).

In the apparatus 10, when the response indicating a normal finish of the control A is received, the control unit 11 updates the apparatus management information 12A (apparatus status) (<17> in FIG. 17). The control unit 11 transmits a response indicating a normal finish of the control A to the OPS 4 (<18> in FIG. 17). In the OPS 4, information indicating the success of the control A is displayed on the screen of a display device (<19> in FIG. 17).

Operation Example 2

Figure 18:
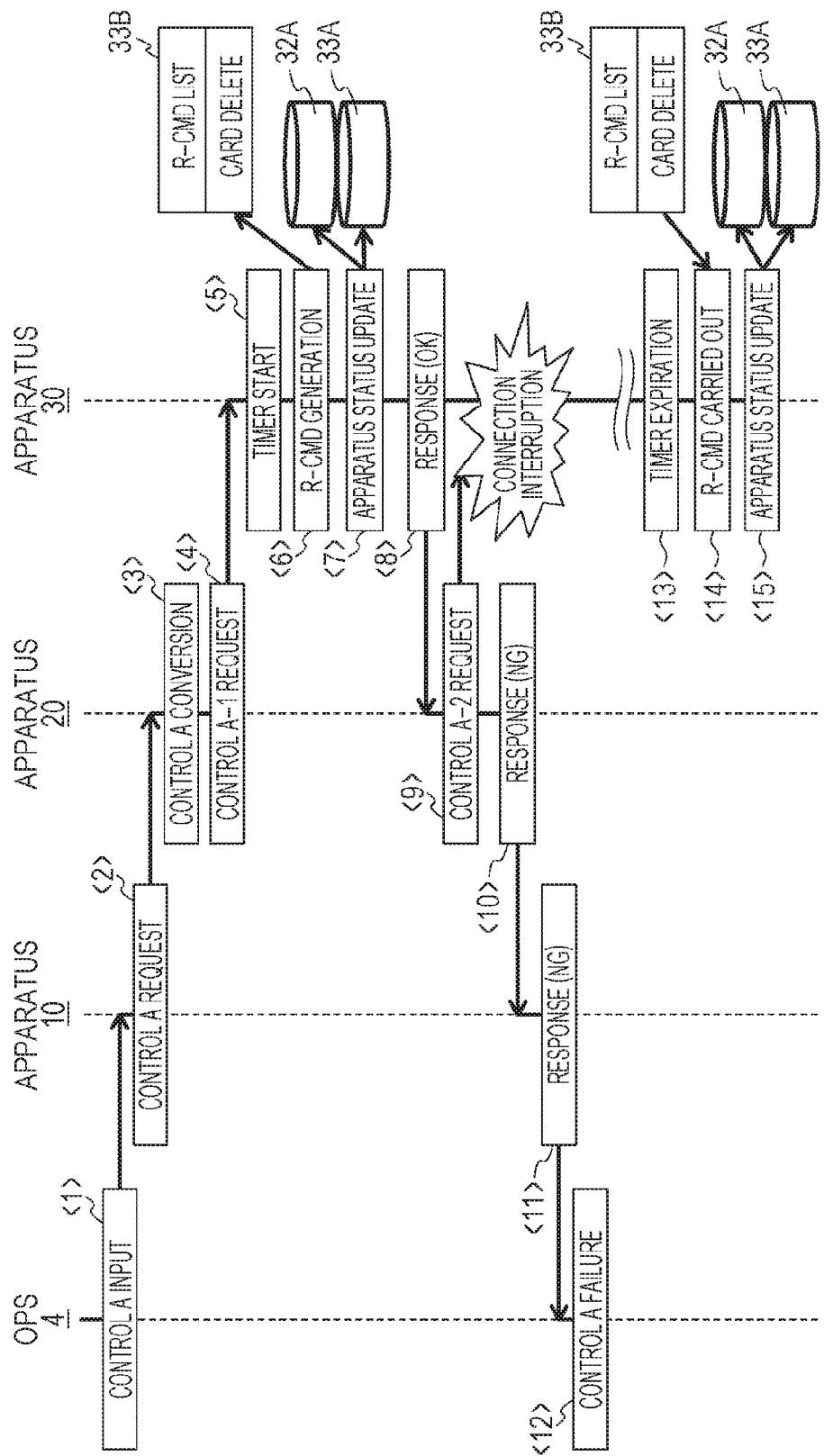
FIG. 18 is a diagram illustrating an example of an operational sequence, according to an embodiment.

FIG. 18 is a sequence diagram illustrating an operation example (Operation Example 2) of resolving a mismatch in apparatus statuses due to a disconnection (communication fault) between the apparatuses 20 and 30. Since the operation of <1> to <9> in FIG. 18 are the same as Operation Example 1, description will not be repeated.

Each time an execution request of the control is transmitted to the apparatus 30, the control results management unit 22 sets a standby timer for a response to the execution request. In a case where a response is received prior to the standby timer expiring, the standby timer stops. In a case where the standby timer expires without a response being received, the control results management unit 22 determines that the control according to the execution request is a failure (NG).

In the Operation Example 2, also in a case where the execution request for the control A-2 is transmitted in <9>, the control results management unit 22 starts the clocking of the standby timer (not illustrated) for a response. However, the connection between the apparatuses 20 and 30 is disconnected after transmission of the response (<8> in FIG. 18) according to the control A-1 to the apparatus 20. Therefore, the apparatus 20 (control results management unit 22) is unable to receive the response corresponding to the control A-2 before the expiration of the timer. Accordingly, the control results management unit 22 registers a control result (abnormal finish) of the failure (NG) in the control results information 24A, and the response results management unit 23 transmits a response indicating the failure of the control A to the apparatus 10. At this point in time, since the control A-1 finishes normally in the apparatus 30, the apparatus status (hardware control information 32A and apparatus configuration information 33A) is updated (<7> in FIG. 18), and a mismatch occurs with the apparatus management information 12A of the apparatus 10.

In the apparatus 10, since the response indicates the failure (NG) of the control A, a response indicating the failure of the control A is transmitted to the OPS 4 without updating the apparatus management information 12A (<11> in FIG. 18). The OPS displays the information indicating the failure of the control A on the screen of a display device (<12> in FIG. 18). In this way, since the apparatus management information 12A is not updated, the apparatus status before execution of the control A is maintained in the apparatus 10. That is, the mismatch with the apparatus status in apparatus 30 is maintained.

Since the control results information 24A indicates an abnormal finish even if the response results management unit 23 receives the reception verification of the response from the apparatus 10, the process is not particularly performed. Therefore, in the apparatus 30, the reception standby timer expires (<13> in FIG. 18). Thus, the timer management unit 35 sends the R-CMD application notification to the R-CMD management unit 34.

The R-CMD management unit 34 that receives the R-CMD application notification references the R-CMD list 33B and provides the reverse command of "card deletion" to the control unit 31. The control unit 31 performs the process in accordance with the reverse command "card deletion" for the main signal control unit 32 (FPGA 306) (<14> in FIG. 18). Thereby, the status of the main signal control unit 32 (FPGA 306) returns to the status before execution of the control A-1 "card registration", and the content of the hardware control information 32A and apparatus configuration information 33A is returned to the status before updating caused by the finish of execution of the control A-1 (<15> in FIG. 18). In this way, the apparatus status of the apparatus 30 returns to the status before the execution of the control A-1 (that is, the control A). In this way, a mismatch between the apparatus status in the apparatus 10 and the apparatus status in the apparatus 30 is resolved.

Operation Example 3

Figure 19:
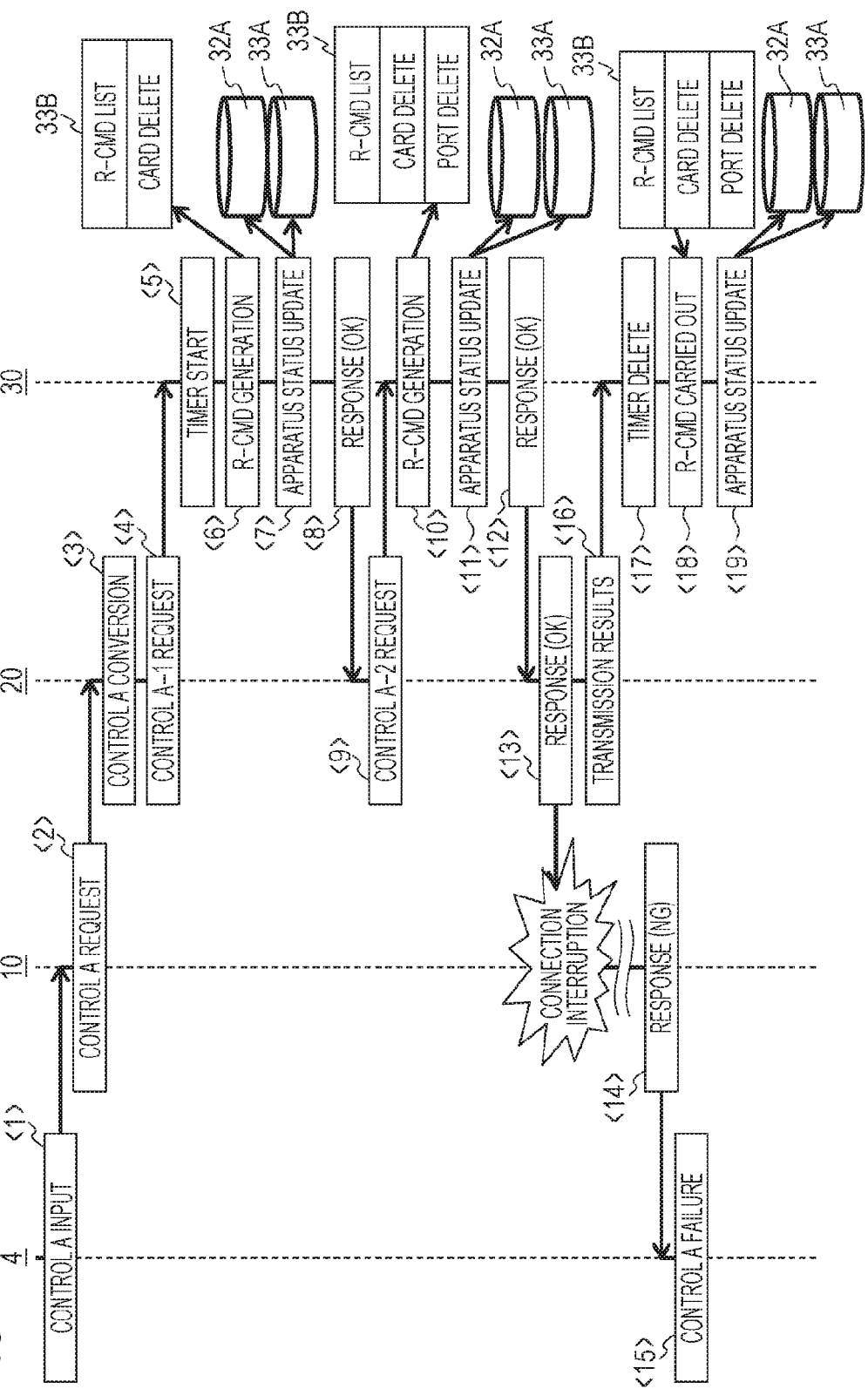
FIG. 19 is a diagram illustrating an example of an operational sequence, according to an embodiment.

FIG. 19 is a sequence diagram illustrating an operation example (Operation Example 3) that resolves a mismatch in apparatus statuses due to a disconnection (communication fault) between the apparatuses 20 and 10. Since the operation of <1> to <13> in FIG. 19 are the same as Operation Example 1, description will not be repeated.

A response transmitted to the apparatus 10 in <13> in FIG. 19 does not reach the apparatus 10 due to the disconnection of the connection between the apparatuses 10 and 20. Meanwhile, in the apparatus 10, the standby timer is set when requesting the control A, and the response is not received by the apparatus 10 before the expiration of the timer.

In this case, the apparatus 10 transmits a response indicating that the execution request of the control A is a failure (NG) at the expiration of the standby timer to the OPS 4 (<14> in FIG. 19). At this time, the apparatus management information 12A is not updated. In the OPS 4, information indicating the failure of the control A is displayed on the screen of the display device (<15> in FIG. 19).

The response results management unit 23 sets the standby timer triggered by the transmission of a response to the apparatus 10. However, since the connection with the apparatus 10 is disconnected, the response results management unit 23 is unable to receive the reception verification from the apparatus 10 before the expiration of the standby timer. In this case, the response results management unit 23 performs a process to be performed when the transmission of the response fails. That is, the response results management unit 23 transmits the timer discard notification and the R-CMD application notification to the apparatus 30 (<16> in FIG. 19).

The timer management unit 35 of the apparatus 30 receives the timer discard notification, and performs deletion of the timer (deletion of the timer information 36A) (<17> in FIG. 19). The R-CMD management unit 34 carries out the reverse command (<18> in FIG. 19). The R-CMD management unit 34 causes the control unit 31 to execute the reverse commands registered in the R-CMD list 33B in accordance with the R-CMD application notification. In the Operation Example 2, a plurality of reverse commands, that is "card deletion" and "port deletion" are registered in the R-CMD list 33B. In this case, the R-CMD management unit 34 causes the control unit 31 to sequentially execute the plurality of reverse commands in reverse order to the registration order in the list 33B.

Specifically, the R-CMD management unit 34 first causes the control unit 31 to execute the "port deletion". When the "port deletion" is finished, the R-CMD management unit 34 causes the control unit 31 to execute the "card deletion". Thereby, the apparatus status (hardware control information 32A and apparatus configuration information 33A) recovers to the status before the start of the control A-1 (<19> in FIG. 19). The mismatch between the apparatus statuses in the apparatuses 10 and 30 is resolved by carrying out the reverse commands in the apparatus 30.

Operation Example 4

FIG. 20 is a sequence diagram illustrating an operation example (Operation Example 4) in which the apparatus 30 is subjected to a power interruption partway through the plurality of controls (A-1 to A-n). Since the operation of <1> to <12> in FIG. 20 are the same as Operation Example 2, description will not be repeated. However, in the Operation Example 2, the control results management unit 22 of the apparatus 20 fails to receive a response to the execution request for the control A-2 due to the disconnection of the connection between the apparatuses 20 and 30. In contrast, in the Operation Example 4, the control results management unit 22 fails to receive the response to the execution request for the control A-2 by the apparatus 30 being subjected to a power interruption after transmission of the execution results (response) of the control A-1. The Operation Example 4 and the Operation Example 2 differ in this regard.

In the apparatus 30, when the power interruption status is resolved (power supply is restarted), the apparatus 30 performs a restart process (<13> in FIG. 20). At this time, the control unit 31 sends the R-CMD application notification to the R-CMD management unit 34.

The R-CMD management unit 34 receives the R-CMD application notification and verifies whether a reverse command is registered in the R-CMD list 33B (<14> in FIG. 20). In the Operation Example 4, since the reverse command of "card deletion" is registered in the R-CMD list 33B, the R-CMD management unit 34 carries out the reverse command "card deletion" (<15> in FIG. 20). Thereby, the apparatus status (hardware control information 32A and apparatus configuration information 33A) recovers to the status before the start of the control A-1 "card registration". Thereby, the mismatch with the apparatus status of the apparatus 10 is resolved.

Effect of Embodiment

According to the above-described embodiment, the R-CMD management unit 34 of the apparatus 30 generates reverse commands according to the execution of the respective controls A-1 to A-n, and stores the reverse commands in the R-CMD list 33B (nonvolatile region 33).

There are cases where the controls A-1 to A-n finish without all of the controls being executed. For example, this includes abnormal finishes for the controls A-1 to A-n or the expiration of the reception standby timer. In a case where not all of the controls A-1 to A-n are executed, the R-CMD management unit 34 causes the control to be executed by the control unit 31 based on the reverse commands stored in the nonvolatile region 33 to cause the information indicating the apparatus status to be recovered to the status before execution of the controls A-1 to A-n.

For example, as described in the Operation Example 1, in a case where the connection between the apparatuses 20 and 30 is disconnected partway through the apparatus 30 executing the plurality of controls A-1 to A-n, the reverse command corresponding to the executed control A-1 is executed. In this way, it is possible for the apparatus status of the apparatus 30 to be recovered to the status before the execution of the controls A-1 to A-n. Thereby, the mismatch with the apparatus status of the apparatus 10 is resolved. That is, resolution of mismatches becomes easy.

In the Operation Example 3 of the embodiment, the R-CMD management unit 34 causes the control unit 31 to execute the control based on the reverse command, in accordance with the R-CMD application notification received from the apparatus 20 when the transmission of the information indicating the normal finish of the control from the apparatus 20 to the apparatus 10 fails. In so doing, it is possible for the mismatch arising in a case where the apparatus status in the apparatus 30 is updated by the apparatus 30 but the apparatus status in the apparatus 10 is not updated by the apparatus 10 due to the disconnection of the connection between the apparatuses 10 and 20, to be automatically resolved by the execution of the reverse commands.

Furthermore, according to the Operation Example 4 of the embodiment, in a case where a mismatch in the apparatus statuses arises by a power interruption in the apparatus 30 occurring partway through the execution of the plurality of controls A-1 to A-n, the reverse command is carried out during the restart of the apparatus 30. Thereby, it is possible for mismatches in apparatus status between the apparatuses 10 and 30 to be automatically resolved.

According to the embodiment, since the mismatch is automatically resolved, it is possible for the maintainer to operate the system without being conscious of a control method specific to the apparatus 30.

Modification Example

In the embodiment, a configuration is adopted in which the apparatus 20 performs one request from the series of controls and performs the request of the next control when the requested control is finished. In contrast, a configuration may be adopted in which the apparatus 20 temporarily sends the request for two or more controls from the series of controls in the apparatus 30 to the apparatus 30, the apparatus 30 buffers the content of the two or more controls and sequentially executes each control.

In the embodiment, an example in which the controls 10 and 30 are transmission apparatuses is described. Understandably, the configuration of the embodiment may be widely applied for a management system in which a translation apparatus is interposed between two apparatuses (first and second apparatuses) with different specifications or configurations, control on one of apparatuses is performed with the control content for the other one of the apparatuses, and the apparatus status of one of the apparatuses is also managed by the other one of apparatuses. It is possible for the above-described configurations of the embodiment to be combined, as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system for restoring a status of an apparatus controlled by multiple commands, the system comprising:
    a first apparatus;
    a second apparatus connected to the first apparatus; and
    a third apparatus connected to the second apparatus, wherein
    the first apparatus includes:
        a first memory configured to store first apparatus-status information indicating a status of the third apparatus that is updated by the first apparatus,
        a first processor coupled to the first memory, configured to:
            provide the second apparatus with a first control command for controlling the third apparatus, and
            update the apparatus-status information stored in the first memory when information indicating a normal finish of the first control command is received from the second apparatus;
    the second apparatus includes a second processor configured to:
        convert the first control command received from the first apparatus to a plurality of second control commands compatible with the third apparatus,
        provide the third apparatus with a request to perform the plurality of second control commands, and
        transmit information indicating a normal finish of the first control command to the first apparatus when all of the plurality of second control commands finish normally; and
    the third apparatus includes:
        a second memory configured to store second apparatus-status information indicating a status of the third apparatus that is updated by the third apparatus, and a reverse command for restoring a result of executing each second control command to a result prior to executing the each second control command,
        a third processor coupled to the second memory, configured to:
            execute the plurality of second control commands, based on a request from the second apparatus, and update the second apparatus-status information in connection with finish of each second control command,
            transmit a normal-finish notification indicating a normal finish of the plurality of second control commands to the second apparatus,
            generate a reverse command in connection with execution of each second control command, and store the generated reverse commands in the second memory, and
            in a case where all of the plurality of second control commands have not been executed, cause the second apparatus-status information to be restored to information indicating a status prior to execution of the plurality of second control commands by executing control based on the reverse commands stored in the second memory.

2. The system of claim 1, wherein
    the third processor executes control based on the one or more reverse commands stored in the second memory in a case where the plurality of second control commands have not normally finished within a predetermined period.

3. The system of claim 1, wherein
    the third processor executes control based on the one or more reverse commands stored in the second memory, upon receiving from the second apparatus a notification that transmission of information indicating a normal finish of the first control from the second apparatus to the first apparatus has failed.

4. The system of claim 1, wherein
    the one or more reverse commands are stored in a nonvolatile region of the second memory; and
    when restarting the third apparatus, the third processor executes control based on the one or more reverse commands when the one or more reverse commands are stored in the second memory.

5. A method for restoring a status of a third apparatus controlled by multiple commands in a system, the system including a first apparatus, a second apparatus connected to the first apparatus, and the third apparatus connected to the second apparatus, the method comprising:
    causing the first apparatus to:
        store first apparatus-status information indicating a status of the third apparatus that is updated by the first apparatus,
        provide the second apparatus with a first control command for controlling the third apparatus, and
        update the apparatus-status information when information indicating a normal finish of the first control command is received from the second apparatus;
    causing the second apparatus to:
        convert the first control command received from the first apparatus to a plurality of second control commands compatible with the third apparatus,
        provide the third apparatus with a request to perform the plurality of second control commands, and
        transmit information indicating a normal finish of the first control command to the first apparatus when all of the plurality of second control commands finish normally; and
    causing the third apparatus to:
        store second apparatus-status information indicating a status of the third apparatus that is updated by the third apparatus, and a reverse command for restoring a result of executing each second control command to a result prior to executing the each second control command,
        execute the plurality of second control commands, based on a request from the second apparatus, and update the second apparatus-status information in connection with finish of each second control command, transmit a normal-finish notification indicating a normal finish of the plurality of second control commands to the second apparatus,
generate a reverse command in connection with execution of each second control command, and store the generated reverse commands, and
in a case where all of the plurality of second control commands have not been executed, cause the second apparatus-status information to be restored to information indicating a status prior to execution of the plurality of second control commands by executing control based on the reverse commands stored in the third apparatus.

\* \* \* \* \*